(12) United States Patent
Lu et al.

(10) Patent No.: US 8,732,738 B2
(45) Date of Patent: May 20, 2014

(54) AUDIENCE MEASUREMENT SYSTEMS AND METHODS FOR DIGITAL TELEVISION

(75) Inventors: Daozheng Lu, Dunedin, FL (US); Paul C. Kempter, Palm Harbor, FL (US); William A. Feininger, Palm Harbor, FL (US)

(73) Assignee: The Nielsen Company (US), LLC, Schaumburg, IL (US)

( * ) Notice: Subject to any disclaimer, the term of this patent is extended or adjusted under 35 U.S.C. 154(b) by 0 days.

(21) Appl. No.: 13/222,828

(22) Filed: Aug. 31, 2011

(65) Prior Publication Data

US 2011/0314486 A1 Dec. 22, 2011

Related U.S. Application Data

(60) Continuation of application No. 09/909,224, filed on Jul. 19, 2001, which is a division of application No. 09/076,517, filed on May 12, 1998, now abandoned.

(51) Int. Cl.
*H04H 60/32* (2008.01)
(52) U.S. Cl.
USPC .................. 725/18; 725/10; 725/11; 725/12; 725/13; 725/15; 725/16; 725/17; 725/19; 725/20
(58) Field of Classification Search
USPC ...................................... 725/9–21
See application file for complete search history.

(56) References Cited

U.S. PATENT DOCUMENTS

| 3,372,233 A | 3/1968 | Currey |
| 3,845,391 A | 10/1974 | Crosby |
| 3,919,479 A | 11/1975 | Moon et al. |
| 4,025,851 A | 5/1977 | Haselwood et al. |
| 4,027,332 A | 5/1977 | Wu et al. |
| 4,547,804 A | 10/1985 | Greenberg |
| 4,574,304 A | 3/1986 | Watanabe et al. |
| 4,599,644 A | 7/1986 | Fischer |

(Continued)

FOREIGN PATENT DOCUMENTS

| EP | 0161512 | 11/1985 |
| EP | 0195639 | 9/1986 |

(Continued)

OTHER PUBLICATIONS

Canadian Intellectual Property Office, "Notification of a Requisition by the Examiner," issued in connection with Canadian Patent Application Serial No. 2,289,519, on Feb. 9, 2000 (3 pages).

(Continued)

*Primary Examiner* — Jason Salce
(74) *Attorney, Agent, or Firm* — Hanley, Flight & Zimmerman, LLC

(57) ABSTRACT

A television audience measurement system measures viewing of a television program viewed on digital television located in a statistically selected site by (i) retrieving an audience measurement data packet from a television set in order to identify the television program, (ii) detecting an audio code embedded in the television program in order to identify the television program, (iii) extracting an audio signature from the television program in order to identify the television program, (iv) identifying the television program through use of a software agent, and (v) selecting at least one of the retrieving means, the detecting means, the extracting means, and the software agent in order to identify the television program.

27 Claims, 7 Drawing Sheets

(56) References Cited

U.S. PATENT DOCUMENTS

| | | | |
|---|---|---|---|
| 4,622,583 A * | 11/1986 | Watanabe et al. | 725/14 |
| 4,633,302 A | 12/1986 | Damoci | |
| 4,639,779 A | 1/1987 | Greenberg | |
| 4,644,509 A | 2/1987 | Kiewit et al. | |
| 4,647,974 A | 3/1987 | Butler et al. | |
| 4,677,466 A | 6/1987 | Lert, Jr. et al. | |
| 4,697,209 A | 9/1987 | Kiewit et al. | |
| 4,718,106 A | 1/1988 | Weinblatt | |
| 4,739,398 A | 4/1988 | Thomas et al. | |
| 4,750,034 A | 6/1988 | Lem | |
| 4,764,808 A | 8/1988 | Solar | |
| 4,792,864 A | 12/1988 | Watanabe et al. | |
| 4,816,904 A | 3/1989 | McKenna et al. | |
| 4,839,919 A | 6/1989 | Borges et al. | |
| 4,843,562 A | 6/1989 | Kenyon et al. | |
| 4,847,685 A | 7/1989 | Gall et al. | |
| 4,858,000 A | 8/1989 | Lu | |
| 4,876,617 A | 10/1989 | Best et al. | |
| 4,931,871 A | 6/1990 | Kramer | |
| 4,945,412 A | 7/1990 | Kramer | |
| 4,955,070 A | 9/1990 | Welsh et al. | |
| 4,965,825 A | 10/1990 | Harvey et al. | |
| 4,972,503 A | 11/1990 | Zurlinden | |
| 5,003,591 A | 3/1991 | Kauffman et al. | |
| 5,019,899 A | 5/1991 | Boles et al. | |
| 5,023,929 A | 6/1991 | Call | |
| 5,113,437 A | 5/1992 | Best et al. | |
| 5,138,659 A | 8/1992 | Kelkar et al. | |
| 5,155,762 A | 10/1992 | Croquet et al. | |
| 5,165,069 A | 11/1992 | Vitt et al. | |
| 5,200,822 A | 4/1993 | Bronfin et al. | |
| 5,251,324 A | 10/1993 | McMullan, Jr. | |
| 5,278,988 A | 1/1994 | Dejean et al. | |
| 5,294,977 A | 3/1994 | Fisher et al. | |
| 5,319,453 A | 6/1994 | Copriviza et al. | |
| 5,369,440 A | 11/1994 | Sussman | |
| 5,373,315 A | 12/1994 | Dufresne et al. | |
| 5,374,951 A | 12/1994 | Welsh | |
| 5,379,345 A | 1/1995 | Greenberg | |
| 5,404,160 A | 4/1995 | Schober et al. | |
| 5,404,161 A | 4/1995 | Douglass et al. | |
| 5,404,377 A | 4/1995 | Moses | |
| 5,425,100 A | 6/1995 | Thomas et al. | |
| 5,436,653 A | 7/1995 | Ellis et al. | |
| 5,437,050 A | 7/1995 | Lamb et al. | |
| 5,450,122 A | 9/1995 | Keene | |
| 5,450,490 A | 9/1995 | Jensen et al. | |
| 5,457,807 A | 10/1995 | Weinblatt | |
| 5,481,294 A | 1/1996 | Thomas et al. | |
| 5,485,518 A | 1/1996 | Hunter et al. | |
| 5,488,408 A | 1/1996 | Maduzia et al. | |
| 5,490,060 A | 2/1996 | Malec et al. | |
| 5,495,282 A | 2/1996 | Mostafa et al. | |
| 5,497,185 A | 3/1996 | Dufresne et al. | |
| 5,504,518 A | 4/1996 | Ellis et al. | |
| 5,512,933 A | 4/1996 | Wheatley et al. | |
| 5,526,427 A | 6/1996 | Thomas et al. | |
| 5,532,732 A | 7/1996 | Yuen et al. | |
| 5,559,549 A | 9/1996 | Hendricks et al. | |
| 5,572,246 A | 11/1996 | Ellis et al. | |
| 5,574,962 A | 11/1996 | Fardeau et al. | |
| 5,579,124 A | 11/1996 | Aijala et al. | |
| 5,581,800 A | 12/1996 | Fardeau et al. | |
| 5,583,784 A | 12/1996 | Kapust et al. | |
| 5,594,934 A * | 1/1997 | Lu et al. | 725/18 |
| 5,600,364 A | 2/1997 | Hendricks et al. | |
| 5,608,445 A | 3/1997 | Mischler | |
| 5,610,653 A | 3/1997 | Abecassis | |
| 5,612,729 A | 3/1997 | Ellis et al. | |
| 5,621,454 A | 4/1997 | Ellis et al. | |
| 5,629,739 A | 5/1997 | Dougherty | |
| 5,630,203 A | 5/1997 | Weinblatt | |
| 5,646,675 A | 7/1997 | Copriviza et al. | |
| 5,654,748 A | 8/1997 | Matthews, III | |
| 5,659,350 A | 8/1997 | Hendricks et al. | |
| 5,675,510 A | 10/1997 | Coffey et al. | |
| 5,676,282 A | 10/1997 | Satterfield | |
| 5,701,582 A | 12/1997 | DeBey | |
| 5,726,701 A | 3/1998 | Needham | |
| 5,734,444 A | 3/1998 | Yoshinobu | |
| 5,737,025 A | 4/1998 | Dougherty et al. | |
| 5,757,414 A | 5/1998 | Thorne | |
| 5,764,763 A | 6/1998 | Jensen et al. | |
| 5,768,680 A | 6/1998 | Thomas | |
| 5,771,307 A | 6/1998 | Lu et al. | |
| 5,787,334 A | 7/1998 | Fardeau et al. | |
| 5,793,414 A | 8/1998 | Shaffer | |
| 5,796,952 A | 8/1998 | Davis et al. | |
| 5,798,785 A | 8/1998 | Hendricks et al. | |
| 5,815,297 A | 9/1998 | Ciciora | |
| 5,819,156 A | 10/1998 | Belmont | |
| 5,826,164 A | 10/1998 | Weinblatt | |
| 5,832,223 A * | 11/1998 | Hara et al. | 725/114 |
| 5,842,010 A | 11/1998 | Jain et al. | |
| 5,848,396 A | 12/1998 | Gerace | |
| 5,850,249 A | 12/1998 | Massetti et al. | |
| 5,857,190 A | 1/1999 | Brown | |
| 5,872,588 A * | 2/1999 | Aras et al. | 725/14 |
| 5,880,789 A | 3/1999 | Inaba | |
| 5,881,360 A | 3/1999 | Fong | |
| 5,889,548 A | 3/1999 | Chan | |
| 5,905,865 A | 5/1999 | Palmer et al. | |
| 5,910,988 A | 6/1999 | Ballard | |
| 5,914,746 A | 6/1999 | Matthews, III et al. | |
| 5,933,646 A | 8/1999 | Hendrickson et al. | |
| 5,963,914 A | 10/1999 | Skinner et al. | |
| 5,973,625 A | 10/1999 | Nam | |
| 5,973,750 A | 10/1999 | Ogawa et al. | |
| 5,974,299 A | 10/1999 | Massetti | |
| 5,990,927 A * | 11/1999 | Hendricks et al. | 725/132 |
| 6,031,577 A * | 2/2000 | Ozkan et al. | 348/465 |
| 6,085,066 A | 7/2000 | Fong | |
| 6,112,053 A | 8/2000 | Dunki-Jacobs et al. | |
| 6,118,873 A | 9/2000 | Lotspiech et al. | |
| 6,124,877 A | 9/2000 | Schmidt | |
| 6,130,726 A | 10/2000 | Darbee et al. | |
| 6,160,570 A | 12/2000 | Sitnik | |
| 6,169,843 B1 | 1/2001 | Lenihan et al. | |
| 6,184,918 B1 | 2/2001 | Goldschmidt Iki et al. | |
| 6,202,210 B1 | 3/2001 | Ludtke | |
| 6,259,443 B1 | 7/2001 | Williams, Jr. | |
| 6,286,140 B1 * | 9/2001 | Ivanyi | 725/14 |
| 6,353,929 B1 | 3/2002 | Houston | |
| 6,421,445 B1 | 7/2002 | Jensen et al. | |
| 6,473,903 B2 | 10/2002 | Balakrishnan et al. | |
| 6,510,557 B1 | 1/2003 | Thrift | |
| 6,512,796 B1 | 1/2003 | Sherwood | |
| 6,513,161 B2 | 1/2003 | Wheeler et al. | |
| 6,647,548 B1 | 11/2003 | Lu et al. | |
| 6,675,383 B1 | 1/2004 | Wheeler et al. | |
| 6,735,775 B1 | 5/2004 | Massetti | |
| 6,738,978 B1 | 5/2004 | Hendricks et al. | |
| 6,751,221 B1 | 6/2004 | Saito et al. | |
| 7,316,025 B1 | 1/2008 | Aijala et al. | |
| 7,454,776 B1 | 11/2008 | Walker et al. | |
| 2004/0088721 A1 | 5/2004 | Wheeler et al. | |

FOREIGN PATENT DOCUMENTS

| | | |
|---|---|---|
| EP | 0210609 | 2/1987 |
| EP | 0245037 | 11/1987 |
| EP | 0283570 | 9/1988 |
| EP | 0598398 | 5/1994 |
| EP | 0687083 | 12/1995 |
| EP | 0703683 | 3/1996 |
| EP | 0840511 | 5/1998 |
| EP | 0985287 | 5/2005 |
| FR | 2555383 | 5/1985 |
| FR | 2717025 | 9/1995 |
| GB | 2170080 | 7/1986 |
| JP | 01177796 | 7/1989 |
| JP | 09083470 | 3/1997 |
| JP | 10145823 | 5/1998 |
| JP | 8508617 | 10/1999 |

(56) References Cited

FOREIGN PATENT DOCUMENTS

| JP | 11275032 | 10/1999 |
|---|---|---|
| KR | 1993-006665 | 7/1993 |
| KR | 930006665 | 7/1993 |
| WO | 8810540 | 12/1988 |
| WO | 9111062 | 7/1991 |
| WO | 9322875 | 11/1993 |
| WO | 9411989 | 5/1994 |
| WO | 9512278 | 5/1995 |
| WO | 9515653 | 6/1995 |
| WO | 9641495 | 12/1996 |
| WO | 9831155 | 7/1998 |
| WO | 9959275 | 11/1999 |
| WO | 9962260 | 12/1999 |
| WO | 0004662 | 1/2000 |
| WO | 0016552 | 3/2000 |

OTHER PUBLICATIONS

Canadian Intellectual Property Office, "Notification of a Requisition by the Examiner," issued in connection with Canadian Patent Application Serial No. 2,289,519, on Jun. 16, 2000 (2 pages).
Canadian Intellectual Property Office, "Notification of a Requisition by the Examiner," issued in connection with Canadian Patent Application Serial No. 2,275,409, on May 10, 2004 (3 pages).
Canadian Intellectual Property Office, "Notification of a Requisition by the Examiner," issued in connection with Canadian Patent Application Serial No. 2,275,409, on Jan. 6, 2005 (2 pages).
Canadian Intellectual Property Office, "Notice of Allowance," issued in connection with Canadian Patent Application Serial No. 2,275,409, on Oct. 11, 2005 (1 page).
English Language Translation of the Granted Claims in connection with Chinese Patent Application Serial No. 98806840.0, on Oct. 17, 2003 (5 pages).
The State Intellectual Property Office of China, "First Office Action," issued in connection with Chinese Patent Application Serial No. 98806840.0, on Oct. 25, 2002, with its English language translation (11 pages).
The State Intellectual Property Office of China, "Notice of Grant of Patent Right to Invention," issued in connection with Chinese Patent Application Serial No. 98806840.0, on Oct. 17, 2003, with its English language translation (4 pages).
The State Intellectual Property Office of China, "Second Office Action," issued in connection with Chinese Patent Application Serial No. 98806840.0, on Apr. 25, 2003, with its English language translation (7 pages).
The State Intellectual Property Office of China, "First Office Action," issued in connection with Chinese Patent Application Serial No. 200310123387.1, on Dec. 8, 2006, with its English language translation (8 pages).
The State Intellectual Property Office of China, "Second Office Action," issued in connection with Chinese Patent Application Serial No. 200310123387.1, on Aug. 3, 2007, with its English language translation (7 pages).
The State Intellectual Property Office of China, "Rejection Decision," issued in connection with Chinese Patent Application Serial No. 200310123387.1, on Apr. 4, 2008, with its English language translation (7 pages).
English Language Translation of the First Office Action in connection with Chinese Patent Application Serial No. 97181455.4, on Jun. 7, 2002 (6 pages).
The State Intellectual Property Office of China, "Second Office Action," issued in connection with Chinese Patent Application Serial No. 97181455.4, on Apr. 25, 2003, with its English language translation (9 pages).
The State Intellectual Property Office of China, "Notice of Decision Granting Patent Right for Invention," issued in connection with Chinese Patent Application Serial No. 97181455.4, on May 21, 2004, with its English language translation (4 pages).

European Patent Office, "Communication Pursuant to Article 96(2) and Rule 51(2) EPC," issued in connection with European Patent Application Serial No. 98 933 309.1, on Mar. 15, 2000 (4 pages).
European Patent Office, "Communication Pursuant to Article 96(2) EPC," issued in connection with European Patent Application Serial No. 98 933 309.1, on Sep. 14, 2000 (4 pages).
European Patent Office, "Communication Pursuant to Article 96(2) EPC," issued in connection with European Patent Application Serial No. 98 933 309.1, on Apr. 23, 2001 (5 pages).
European Patent Office, "Communication Pursuant to Article 96(2) EPC," issued in connection with European Patent Application Serial No. 98 933 309.1, on Sep. 13, 2001 (3 pages).
European Patent Office, "Communication Pursuant to Article 96(2) EPC," issued in connection with European Patent Application Serial No. 98 933 309.1, on Jan. 7, 2003 (6 pages).
European Patent Office, "Summons to Attend Oral Proceedings Pursuant to Rule 71(1) EPC," issued in connection with European Patent Application Serial No. 98 933 309.1, on Mar. 12, 2004 (7 pages).
European Patent Office, "Communication Under Rule 51(4) EPC," issued in connection with European Patent Application Serial No. 98 933 309.1, on Nov. 17, 2004 (11 pages).
European Patent Office, "Communication Pursuant to Article 96(2) EPC," issued in connection with European Patent Application Serial No. 00 114 271.0, on Sep. 13, 2001 (4 pages).
European Patent Office, "Communication Pursuant to Article 96(2) EPC," issued in connection with European Patent Application Serial No. 00 114 271.0, on Jan. 7, 2003 (4 pages).
European Patent Office, "Summons to Attend Oral Proceedings Pursuant to Rule 71(1) EPC," issued in connection with European Patent Application Serial No. 00 114 271.0, on Mar. 11, 2004 (6 pages).
European Patent Office, "Provision of a Copy of the Minutes in Accordance with Rule 76(4) EPC," issued in connection with European Patent Application Serial No. 00 114 271.0, on Nov. 10, 2004 (7 pages).
European Patent Office, "Communication Under Rule 51(4) EPC," issued in connection with European Patent Application Serial No. 00 114 271.0, on Nov. 24, 2004 (4 pages).
European Patent Office, "Annexure of Communication Under Rule 51(4) EPC," issued in connection with European Patent Application Serial No. 00 114 271.0, on Nov. 24, 2004 (6 pages).
European Patent Office, "Decision to Grant a European Patent Pursuant to Article 97(2) EPC," issued in connection with European Patent Application Serial No. 00 114 271.0, on Apr. 21, 2005 (1 page).
European Patent Office, "Communication Pursuant to Article 96(2) EPC," issued in connection with European Patent Application Serial No. 00 114 272.8, on Jul. 3, 2001 (3 pages).
European Patent Office, "Communication Pursuant to Article 96(2) EPC," issued in connection with European Patent Application Serial No. 00 114 272.8, on Nov. 28, 2002 (3 pages).
European Patent Office, "Communication Pursuant to Article 115(2) EPC," issued in connection with European Patent Application Serial No. 00 114 272.8, on Aug. 14, 2003 (16 pages).
European Patent Office, "Communication Pursuant to Article 96(2) EPC," issued in connection with European Patent Application Serial No. 00 114 272.8, on Jun. 28, 2004 (4 pages).
European Patent Office, "Adjournment of Examination/Opposition Proceedings," issued in connection with European Patent Application Serial No. 00 114 272.8, on Apr. 11, 2006 (1 page).
European Patent Office, "Communication Under Rule 51(4) EPC," issued in connection with European Patent Application Serial No. 00 114 272.8, on Mar. 15, 2007 (4 pages).
European Patent Office, "Extended European Search Report," issued in connection with European Patent Application Serial No. 070107129.3, on Apr. 9, 2009 (10 pages).
European Patent Office, "European Search Report," issued in connection with European Patent Application Serial No. 00 114 271.0, on Oct. 16, 2000 (2 pages).
European Patent Office, "European Search Report," issued in connection with European Patent Application Serial No. 00 114 272.8, on Oct. 5, 2000 (4 pages).

(56) References Cited

OTHER PUBLICATIONS

Indian Patent Office, "First Examination Report," issued in connection with Indian Patent Application Serial No. 1812/MAS/98, on Dec. 30, 2004 (3 pages).
Japanese Patent Office, "Office Action (Notice of Grounds of Rejection)," issued in connection with Japanese Patent Application Serial No. 2000-548980, on Apr. 8, 2008, with its English language translation (6 pages).
English Language Translation of the Allowed Claims for Japanese Patent Application Serial No. 2000-548980, dated Mar. 24, 2009 (4 pages).
Japanese Patent Office, "Notice regarding Submission of Prior Art Document by an Anonymous Third Party on May 25, 2007," issued in connection with Japanese Patent Application Serial No. 2000-548980 (3 pages).
English Language Translation of the Notice of Allowance issued by the Japanese Patent Office in connection with Japanese Patent Application Serial No. 2000-548980, on Mar. 10, 2009 (2 pages).
Japanese Patent Office, "Certificate of Patent," issued in connection with JP Patent No. 4287053, on Apr. 3, 2009, with English language translation of the claims (4 pages).
English translation of Information Statement of Video Research filed in counterpart Japanese application No. 2000-548980, May 25, 2007, (8 pages).
Japanese Patent Office, "Office Action (Notice of Grounds for Rejection)," issued in connection with JP Application No. Hei 10-534297, May 13, 2003, with English language translation (6 pages).
Japanese Patent Office, "Decision of Rejection," issued in connection with JP Application No. Hei 10-534297, on Sep. 30, 2003, with English language translation (3 pages).
Japanese Patent Office, "Office Action (Notice of Grounds for Rejection)," issued in connection with JP Application No. 2003-292746, on Mar. 22, 2005, with English language translation (9 pages).
Japanese Patent Office, "Final Rejection," issued in connection with JP Application No. 2003-292746, on Nov. 22, 2005, with English language translation (3 pages).
English Language Translation of the First Office Action issued by the Mexican Patent Office, in connection with Mexican Patent Application Serial No. PA/a/2004/008118, dated Jul. 2, 2007 (1 page).
English Language Translation of the Second Office Action issued by the Mexican Patent Office, in connection with Mexican Patent Application Serial No. PA/a/2004/008118, dated Jan. 2, 2008 (1 page).
BBM, "Matching Pictures, Matching Expectations; The BBM PMT Validation Study Executive Summary Report," Vancouver, Canada, Feb. 9, 1998 (10 pages).
Purdye et al., "Matching Pictures, Matching Expectations; The BBM Validation Test of TN-AGB's Picture Matching Technology," published in "Electronic media and measurement trends—on a collision course" proceedings of the Joint ESOMAR/ARF Worldwide Symposium, Vienna, Apr. 26-28, 1998 (11 pages).
Cook et al., "Metering Television in the Digital Age," published in "Electronic media and measurement trends—on a collision course" proceedings of the Joint ESOMAR/ARF Worldwide Symposium, Vienna, Apr. 26-28, 1998 (4 pages.).
BBM, "The M Files," The Department of Intergalactic Audience Measurement, Canada (2 pages).
SCTE DVS 136, "An Overview of PSIP for Cable," ATSC T3/S8 Doc. 268, issued on Apr. 3, 1998 (5 pages).
Audio Media, "Digital Audio Watermarking," Jan. 1998 (4 pages).
Namba et al., "A Program Identification Code Transmission System Using Low-Frequency Audio Signals," NHK Science and Technical Research Laboratories, Tokyo, Japan, Mar. 1985 (14 pages).
Steele et al., "Simultaneous Transmission of Speech and Data Using Code-Breaking Techniques," pp. 2061-2105, vol. 60, No. 9, The Bell System Technical Journal, American Telephone and Telegraph Company, issued in Nov. 1981 (25 pages).
Advanced Television Systems Committee, "Guide to the Use of the ATSC Digital Television Standard," 2003, (pp. 1-148).

Advanced Television Systems Committee, "Program and System Information Protocol for Terrestrial Broadcast and Cable (Revision A) and Amendment No. 1. Doc A/65A," May 31, 2000.
Advanced Television Systems Committee, "Program/Episode/Version Identification. ATSC Standard." Doc. A/57. Aug. 30, 1996.
V. Balabanian et al. An introduction to Digital Storage Media—Command and Control (DSM-CC). IEEE Communications Magazine, Nov. 1996.
Patent Cooperation Treaty, "International Search Report," issued by the International Searching Authority in connection with PCT application No. PCT/US1998/023558, mailed Aug. 27, 1999 (4 pages).
Patent Cooperation Treaty, "International Search Report," issued by the International Searching Authority in connection with PCT application No. PCT/US2000/003829, mailed Aug. 18, 2000 (3 pages).
Patent Cooperation Treaty, "International Search Report," issued by the International Searching Authority in connection with PCT application No. PCT/US98/14286, mailed Jul. 1, 1999 (3 pages).
United States Patent and Trademark Office, "Notice of Abandonment," issued in connection with U.S. Appl. No. 09/076,517, on Dec. 6, 2006 (2 pages).
United States Patent and Trademark Office, "Non-Final Office Action," issued in connection with U.S. Appl. No. 09/076,517, on Mar. 5, 2002 (14 pages).
United States Patent and Trademark Office, "Non-Final Office Action," issued in connection with U.S. Appl. No. 09/076,517, on Nov. 19, 2002 (11 pages).
United States Patent and Trademark Office, "Final Office Action," issued in connection with U.S. Appl. No. 09/076,517, on Aug. 11, 2003 (14 pages).
United States Patent and Trademark Office, "Final Office Action," issued in connection with U.S. Appl. No. 09/076,517, on Mar. 11, 2004 (17 pages).
United States Patent and Trademark Office, "Examiner's Answer in response to the Appeal Brief filed Apr. 13, 2005," issued in connection with U.S. Appl. No. 09/076,517, on Nov. 2, 2005 (14 pages).
United States Patent and Trademark Office, "Decision on Appeal," issued in connection with U.S. Appl. No. 09/076,517, on Sep. 26, 2006 (12 pages).
United States Patent and Trademark Office, "Non-Final Office Action," issued in connection with U.S. Appl. No. 09/949,938, on Oct. 24, 2002 (11 pages).
United States Patent and Trademark Office, "Non-Final Office Action," issued in connection with U.S. Appl. No. 09/949,938, on May 9, 2003 (8 pages).
United States Patent and Trademark Office, "Final Office Action," issued in connection with U.S. Appl. No. 09/949,938, on Nov. 7, 2003 (11 pages).
United States Patent and Trademark Office, "Non-Final Office Action," issued in connection with U.S. Appl. No. 11/339,269, on Feb. 15, 2008 (28 pages).
United States Patent and Trademark Office, "Final Office Action," issued in connection with U.S. Appl. No. 11/339,269, on Nov. 26, 2008 (29 pages).
United States Patent and Trademark Office, "Advisory Action Before the Filing of an Appeal Brief," issued in connection with U.S. Appl. No. 11/339,269, on Feb. 25, 2009 (3 pages).
United States Patent and Trademark Office, "Non-Final Office Action," issued in connection with U.S. Appl. No. 11/595,117, on Nov. 25, 2008 (7 pages).
United States Patent and Trademark Office, "Final Office Action," issued in connection with U.S. Appl. No. 09/909,224, on Sep. 17, 2009 (30 pages).
United States Patent and Trademark Office, "Non-Final Office Action," issued in connection with U.S. Appl. No. 09/909,224, on Feb. 6, 2009 (27 pages).
United States Patent and Trademark Office, "Final Office Action," issued in connection with U.S. Appl. No. 09/909,224, on Aug. 1, 2007 (24 pages).
United States Patent and Trademark Office, "Non-Final Office Action," issued in connection with U.S. Appl. No. 09/909,224, on Mar. 22, 2007 (23 pages).

(56) References Cited

OTHER PUBLICATIONS

United States Patent and Trademark Office, "Final Office Action," issued in connection with U.S. Appl. No. 09/909,224, on Jun. 15, 2006 (21 pages).

United States Patent and Trademark Office, "Non-Final Office Action," issued in connection with U.S. Appl. No. 09/909,224, on Oct. 19, 2005 (17 pages).

United States Patent and Trademark Office, "Notice of Allowance," issued in connection with U.S. Appl. No. 11/339,269, on Jun. 8, 2009 (6 pages).

United States Patent and Trademark Office, "Status Letter Reply," issued in connection with U.S. Appl. No. 08/786,270, on Apr. 30, 1998 (2 pages).

United States Patent and Trademark Office, "Non-Final Office Action," issued in connection with U.S. Appl. No. 08/786,270, on Jun. 16, 1999 (5 pages).

United States Patent and Trademark Office, "Non-Final Office Action," issued in connection with U.S. Appl. No. 08/786,270, on Jul. 28, 1999 (11 pages).

United States Patent and Trademark Office, "Non-Final Office Action," issued in connection with U.S. Appl. No. 08/786,270, on Jan. 20, 2000 (8 pages).

United States Patent and Trademark Office, "Final Office Action," issued in connection with U.S. Appl. No. 08/786,270, on Sep. 5, 2000 (8 pages).

United States Patent and Trademark Office, "Advisory Action," issued in connection with U.S. Appl. No. 08/786,270, on Dec. 11, 2000 (1 pages).

United States Patent and Trademark Office, "Examiner's Communication," issued in connection with U.S. Appl. No. 08/786,270, on Jul. 10, 2001 (2 pages).

United States Patent and Trademark Office, "Decision on Appeal," issued in connection with U.S. Appl. No. 08/786,270, on Mar. 31, 2003 (18 pages).

United States Patent and Trademark Office, "Notice of Allowance," issued in connection with U.S. Appl. No. 08/786,270, on Jul. 28, 2003 (5 pages).

United States Patent and Trademark Office, "Non-Final Office Action," issued in connection with U.S. Appl. No. 09/859,764, on May 22, 2002 (8 pages).

United States Patent and Trademark Office, "Notice of Allowance," issued in connection with U.S. Appl. No. 09/859,764, on Sep. 3, 2002 (4 pages).

United States Patent and Trademark Office, "Election/Restrictions Requirement," issued in connection with U.S. Appl. No. 10/693,549, on Nov. 13, 2008 (6 pages).

United States Patent and Trademark Office, "Non-Final Office Action," issued in connection with U.S. Appl. No. 10/693,549, on Apr. 1, 2009 (12 pages).

Australian Intellectual Property Office, "Notice of Acceptance," issued in connection with Australian Patent Application Serial No. 57833/01, on Dec. 3, 2002 (2 pages).

Australian Intellectual Property Office, "Examiner's First Report," issued in connection with Australian Patent Application Serial No. 82980/98, on Jul. 24, 2000 (2 pages).

"The Claims Defining the Invention," which were allowed in connection with Australian Patent Application Serial No. 57830/01, Dec. 3, 2002 (4 pages).

Australian Intellectual Property Office, "Notice of Acceptance," issued in connection with Australian Patent Application Serial No. 57830/01, on Dec. 3, 2002 (2 pages).

"The Claims Defining the Invention," which were allowed in connection with Australian Patent Application Serial No. 57831/01, Sep. 9, 2003 (1 page).

Australian Intellectual Property Office, "Notice of Acceptance," issued in connection with Australian Patent Application Serial No. 57831/01, on Sep. 9, 2003 (2 pages).

Australian Intellectual Property Office, "Notice of Acceptance," issued in connection with Australian Patent Application Serial No. 57832/01, on Oct. 27, 2003 (2 pages).

Australian Intellectual Property Office, "Examiner's First Report," issued in connection with Australian Patent Application Serial No. 31489/97, on Mar. 2, 2000 (1 page).

Australian Intellectual Property Office, "Examiner's Second Report," issued in connection with Australian Patent Application Serial No. 31489/97, on Mar. 21, 2001 (1 page).

Australian Intellectual Property Office, "Examiner's First Report," issued in connection with Australian Patent Application Serial No. 2003262297, on Jul. 6, 2005 (2 pages).

Australian Intellectual Property Office, "Notice of Acceptance," issued in connection with Australian Patent Application Serial No. 31489/97, on May 30, 2001 (2 pages).

Australian Intellectual Property Office, "Examiner's First Report," issued in connection with Australian Patent Application Serial No. 46028/01, on Jun. 13, 2002 (1 page).

"The Claims Defining the Invention," which were allowed in connection with Australian Patent Application Serial No. 57832/01, Oct. 27, 2003 (2 pages).

\* cited by examiner

AUDIENCE MEASUREMENT SYSTEMS AND METHODS FOR DIGITAL TELEVISION

RELATED APPLICATION

This patent arises from a continuation of U.S. patent application Ser. No. 09/909,224, filed Jul. 19, 2001, which is a divisional of U.S. patent application Ser. No. 09/076,517, which was filed on May 12, 1998. Both U.S. patent application Ser. No. 09/909,224 and U.S. patent application Ser. No. 09/076,517 are hereby incorporated by reference in their entireties.

FIELD OF THE DISCLOSURE

The present disclosure relates to the measurement of audiences of digitally broadcast television programming and to the measurement of usage of other information services provided to the audiences.

BACKGROUND

Of the many approaches to measuring the usage of electronic entertainment equipment (commonly called "tuning" data), one approach involves the addition of an identifying code to a radio or television program, the distribution of the identifying code with the program throughout the relevant broadcasting system, and the detection and interpretation of the identifying code when the broadcast signal is viewed or heard in a statistically selected monitoring site. An example of a system which implements this type of measurement approach may be found in the following patents: U.S. Pat. No. 5,481,294 to Thomas et al., who describe, inter alia, identifying codes added to the vertical blanking interval of an NTSC television broadcast; U.S. Pat. No. 5,629,739 to Dougherty, who is particularly concerned with the addition of an identifying code to a low energy portion of the audio spectrum of an NTSC signal; and U.S. Pat. No. 5,404,377 to Moses, who teaches an audio encoding arrangement using signal masking to decrease the perceptibility of the identifying code. The disclosures of U.S. Pat. No. 5,481,294, U.S. Pat. No. 5,629,739, and U.S. Pat. No. 5,404,377 are herein incorporated by reference.

Another approach to measuring usage of electronic entertainment equipment involves the extraction of a characteristic feature signature (or characteristic feature signature set) from the programming selected for viewing, and the storing of a time-stamped signature (or signature set) in a memory for subsequent transmission to a central data collection office where the signature (or signature set) is compared with corresponding reference signatures collected by the central office from known broadcasting sources. This approach is taught by Lert and Lu in U.S. Pat. No. 4,677,466. The teaching of U.S. Pat. No. 4,677,466 is herein incorporated by reference.

Yet another approach to the measurement of the usage of electronic entertainment equipment has been that of comparing the viewed signal (or some component or artifact thereof) with all the signals available to a sampled household at the time the measurement is made. A review of apparatus and methods useful for this measurement approach is found in the teachings of Thomas et al. in U.S. Pat. No. 5,629,739 and of Lu et al. in U.S. Pat. No. 5,594,934. The teachings in U.S. Pat. No. 5,594,934 and in U.S. Pat. No. 5,629,739 are herein incorporated by reference.

Wheeler, et al., in U.S. application Ser. No. 08/786,270, filed on Jan. 22, 1997, teach a video signal source detection arrangement which determines the source of a video and/or audio signal being displayed by a television receiver. The arrangement implements a variety of tuning measurement approaches. For example, it can be used to read an identifying ancillary code transmitted with television programming, to obtain characteristic feature signatures from television programming, or to obtain a signal that is matched with a contemporary reference signal obtained by a television tuner controlled by measurement equipment. The disclosure of the aforementioned U.S. application Ser. No. 08/786,270 is herein incorporated by reference.

Chan, in U.S. application Ser. No. 08/654,309, filed on May 28, 1996, teaches a sensor arrangement for non-intrusively obtaining a representation of video and synchronization signals from a television receiver. The disclosure of the aforementioned U.S. application Ser. No. 08/654,309 is herein incorporated by reference.

Changes in the methods of measuring the reception of television or radio programming are required because of a planned change-over from analog to digital broadcasting. In the U.S., the change-over is scheduled to be phased in by the year 2006, as documented in the Federal Communication Commission's Mass Media Docket 87-268, with particular reference to the Fifth Report and Order, FCC 97-116, Apr. 3, 1997 and to the Sixth Report and Order, FCC 97-115, Apr. 3, 1997. Some of the changes, and their respective impacts on approaches used for measuring analog broadcasts, include the following: (1) digital broadcast techniques do not use a vertical blanking interval and, therefore, the program tracking and identifying codes that are written in the vertical blanking interval of analog broadcast signals will not be transmitted; (2) multiple signal formats and associated multiple display formats having, among other features, differing height-to-width ratios and different resolutions are allowed, so that existing video signal correlation methods used with analog broadcasts may essentially be disabled because these methods depend on having the same pictorial feature appear at corresponding places on the measured and reference displays; (3) a broadcaster can transmit as many as six programs (arrayed as a sequence of data packets, where each data packet is labeled as to which of the programs' data is carried therein) within an assigned 6 MHZ frequency band by trading off pictorial resolution for an increase in the number of programs so that (i) digital signal compression methods used to decrease the spectrum space required by a program destroy program identifying codes embedded in an original, high-resolution, program master, and (ii) determining which channel has been tuned by a receiver does not uniquely identify a program being viewed if more than one program is being transmitted in that channel; and, (4) data other than television broadcasting may be co-transmitted in the same channel and, in some cases, it is expected that the other data will be related in some manner to the co-transmitted programming so that a viewer can interact with the TV programming (e.g., to obtain a program guide or detailed information on an advertised product, to automatically switch to a desired program, or to take part in an audience-participation program).

It may be noted that, although projected digital signal compression and transmission methods destroy the types of video codes used in, and suggested for, the prior-generation analog broadcasting approaches, it is expected that less change will be encountered with respect to audio codes. That is, because the audio component of a television broadcast comprises much less information than does the video, there is much less to be gained by applying signal compression methods to audio. Nonetheless, it is expected that various audio compression methods may be employed. These methods include those defined by the Dolby AC-3 or the European MUSICAN standards, or those defined by some yet-to-be-defined standard operable within the relatively open and flexible MPEG arrangement. Although the coding approaches taught in the aforementioned U.S. Pat. No. 5,404,377 are known to survive the Dolby AC-3 and MUSICAN compression methods, compression methods other than Dolby AC-3 and MUSICAN may destroy these codes. Moreover, although the change in technology may obviate the use of some of the codes, such as those described above, other codes (e.g., digital data packet codes telling a receiving site which of several interleaved programs is associated with a given data packet) are expected to be broadcast both with television programming and with any co-transmitted data that are related to, and intended to be used in conjunction with, one or more of the programs.

In addition to changes in transmission equipment and signals, considerable changes are expected in reception equipment. Notable among these are both the use of set top signal converters (generally referred to as set top boxes) allowing a digital broadcast to be viewed on an analog receiver, and a projected convergence of television receivers and computers. In the short term, for example, it is expected that digital receivers, configured as plug-in boards for personal computers, will be used to enable the display of digital television signals on the computers.

Another traditional measurement reflected in television audience reporting has been the determination of who actually viewed the program that was received by the equipment being monitored in a statistically selected monitoring site. A related measurement of interest is the identification of users of on-line services, such as on-line services provided over the Internet. Also, it is clear that measuring the members of an audience in a statistically selected monitoring site who are interactively using a television and/or accessing the Internet, and the information delivery apparatus used to deliver information to the members, will continue to be important.

By far the most commonly used approach in making these measurements is that of interrogation, wherein the viewer and/or Internet user is asked to identify himself or herself as a member of the television audience or as an Internet user. In connection with television viewing, this inquiry is usually done by means of an electronic prompting and data input device (commonly referred to as a Peoplemeter) associated with a monitored receiver in a statistically selected monitoring site. The member identification may also include age, sex, and other demographic data. It is common to store both the demographic data and the tuning data associated with each monitored receiver in the statistically selected monitoring site in store-and-forward equipment located within the monitoring site and to subsequently forward these data to a central office computer via a direct call over the public switched telephone network, or via the Internet, on a daily basis.

Of particular interest in this area is the teaching of an audience interrogation arrangement disclosed by McKenna et al., in U.S. Pat. No. 4,816,904. According to this arrangement, a prompting message is displayed on a television screen overlaid on viewer selected programming by mixing the prompting message with the video signal being sent to the display. However, McKenna et al. do not teach a "tiling" arrangement where the prompting message is displayed on a portion of a display separated from the portion of the display devoted to television picture.

Many arrangements have been proposed in the computer arts for reliably identifying a user so that only selected individuals can secure access to some of the data on a computer or computer system. The most common of such arrangements is that of requiring the user to enter both his or her claimed identity along with a password. Other arrangements have included the use of various biometric techniques, such as image or voice recognition devices. Additionally, it is well known in the audience measurement arts to use computer-based image recognition in order to identify members of a viewing audience. Notable among teachings in this area is that by Lu in U.S. Pat. No. 4,858,000. The teaching of this patent is herein incorporated by reference.

DETAILED DESCRIPTION

Figure 1:
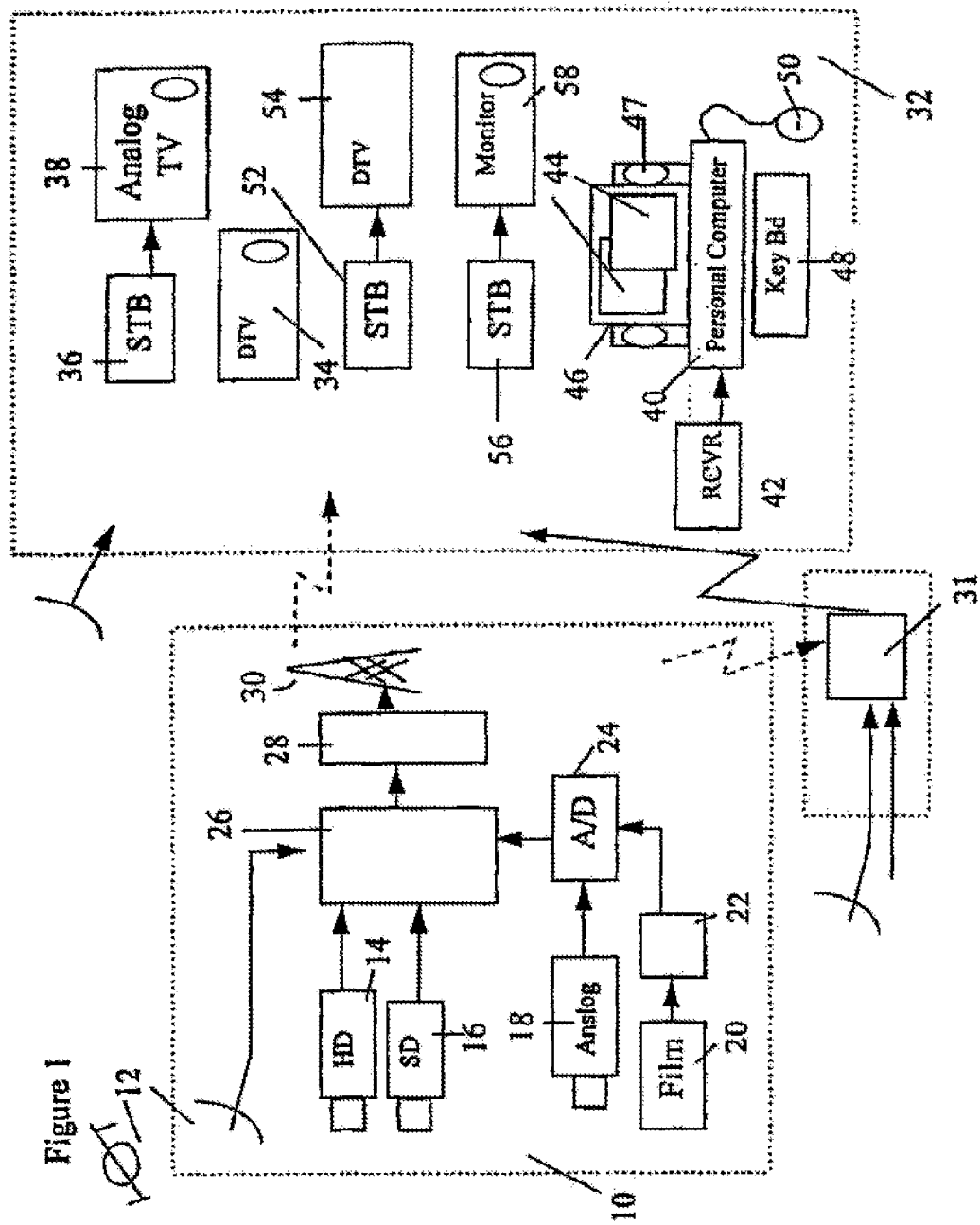
FIG. 1 is a schematic block diagram depicting typical digital television broadcasting and reception equipment.

A typical digital television broadcasting environment, which is planned during a transition period in which both digital and analog programs are transmitted, may comprise some combination of the elements depicted in FIG. 1. Network programming, and other non-local programming, is provided to a local television station 10 from a broadcast station over a communication medium 12, such as a satellite, or terrestrial digital transmission lines, or the like. Local programming is also provided to the local television station 10 from some mixture of high definition television (HDTV) cameras 14 (which may employ a variety of formats), standard definition digital video cameras 16 (which may employ a variety of resolutions and aspect ratios), and analog sources comprising both analog video cameras 18 (e.g., those compatible with the prior generation NTSC broadcast standard), and cinema film sources 20 that have historically been converted to the NTSC standard by means of well known telecine 22.

The signals from the analog video cameras 18 and from the cinema film sources 20 are input to an A/D converter 24 having an appropriate digital output. The outputs from the A/D converter 24, from the communication medium 12, from the high definition television (HDTV) cameras 14, and/or from the standard definition digital video cameras 16 are provided to a switching and routing apparatus 26. The switching and routing apparatus 26 passes selected ones of the signals provided to it through digital compression equipment 28 prior to being broadcast from the station's transmitter 30.

The station's transmitter 30 may also include an antenna, a satellite dish, a cable modem, or the like.

In addition, a cable headend 31 (which is shown as a single cable provider but which may represent a plurality of cable providers) receives signals over the air, from satellite distribution, or the like, and distributes the signals (with or without reformatting) by way of regular cables, optical fibers, microwaves, or the like.

The digital transmission from the local television station 10 and/or from the cable headend 31 may be directly received and displayed in a statistically selected monitoring site 32 by a digital television set 34. The digital transmission also may be directly received and converted by a digital converter 36 (commonly configured as a set top box or STB) into an analog output (e.g., in the NTSC format) for use by an analog television set 38 purchased by a viewer prior to the change-over to digital programming. The digital transmission further may be directly received and displayed by a personal computer 40 that has a digital receiver 42 providing a baseband video output signal that the personal computer 40 can show in one of the windows 44 defined on its display unit 46. The digital receiver 42, for example, could be a plug in board of the personal computer 40 or integrated on the motherboard. The personal computer also may have speakers 47, a keyboard 48, and a mouse 50 or other pointing device known in the art.

Moreover, the digital transmission may be directly received and converted by a digital converter 52 to a form useable by a digital television set 54. For example, the digital converter 52 may be used for pay-per-view television programming, video-on-demand television programming, satellite programs, and/or other services provided to the statistically selected monitoring site 32. The digital transmission also may be directly received and converted by a digital converter 56 to a form useable by a simple monitor 58. In either of these two cases, the digital television viewing can be measured by means of metering technologies similar to the set top box and an analog television configuration described below.

In addition to the direct reception of the digital transmission by apparatus dedicated solely to that purpose (e.g., the digital television set 34 and/or the personal computer 40), it is expected that a variety of yet-to-be-defined consumer electronic apparatuses will be configured that incorporate at least some of the features of both a digital or analog television receiver and a home computer.

Figure 2:
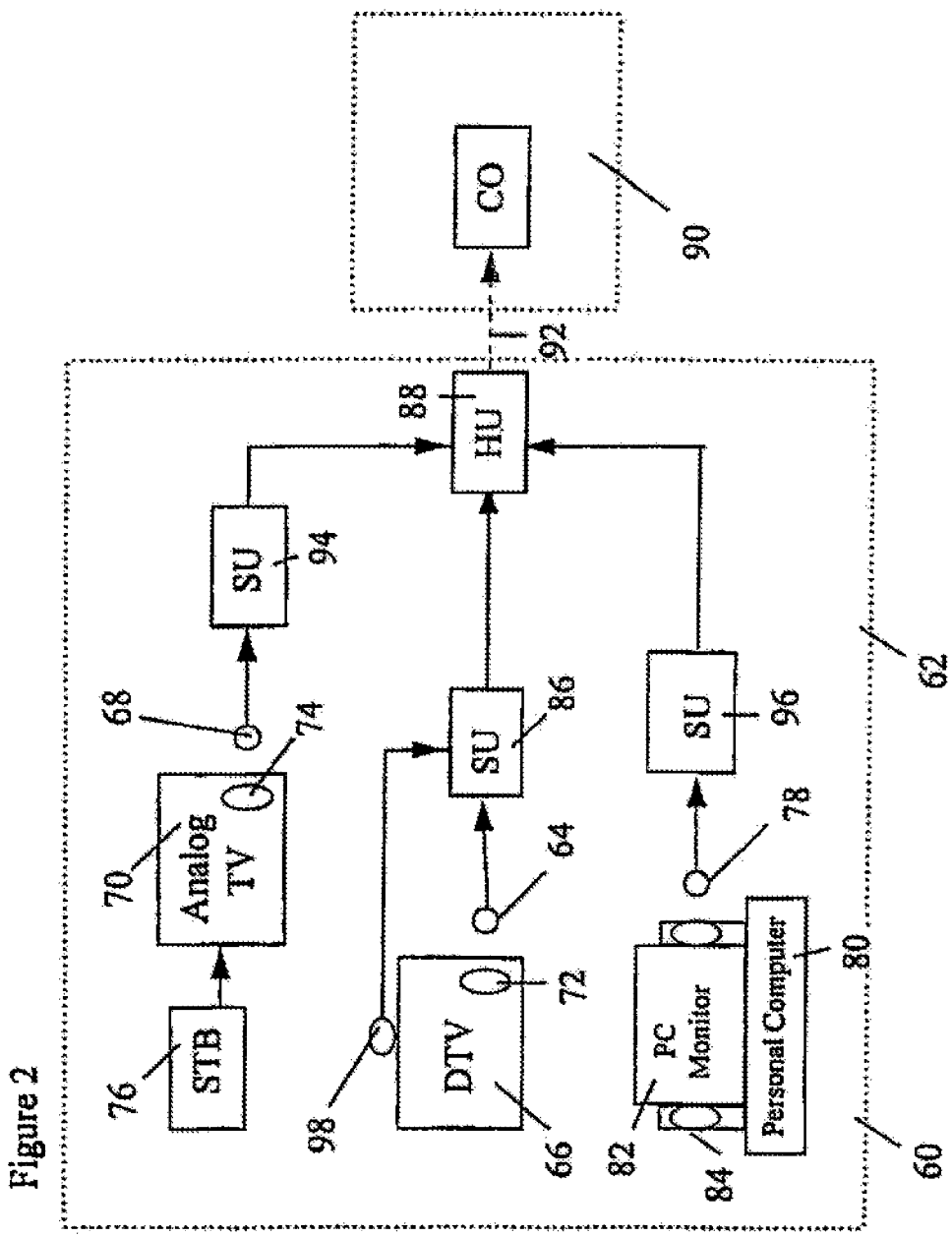
FIG. 2 is a schematic block diagram depicting an audio-based tuning measurement system which is usable with either digital or analog broadcasting and which is in accordance with a first embodiment of the present invention.

A first embodiment 60 of the present invention, which measures tuning to digital television programming received in a statistically selected monitoring site 62, is depicted schematically in FIG. 2. The first embodiment 60 measures such tuning by detecting program identification codes and/or extracting signatures from the audio portion of the television signal to which a receiver is tuned. This audio portion is detected by a detector 64 in the case of a digital television set 66, and by a detector 68 in the case of an analog television set 70. The detector 64 may detect the audio portion of a program to which the digital television set 66 is tuned by non-intrusively detecting the sound provided by a speaker 72 of the digital television set 66 (in which case the detector 64 may be a microphone) or by intrusively detecting the audio signal from a direct connection to the speaker, the audio output terminals, or the audio processing circuitry of the digital television set 66. Similarly, the detector 68 may detect the audio portion of a program to which the analog television set 70 is tuned by non-intrusively detecting the sound provided by a speaker 74 of the digital television set 66 or by intrusively detecting the audio signal from a direct connection to the speaker, the audio output terminals, or the audio processing circuitry of the analog television set 70. The analog television receiver 70 is provided with a digital converter 76, which may be similar to the digital converter 36 of FIG. 1.

The audio portion of a television program may also be detected by a detector 78 when the television program is played by a personal computer 80 on a monitor 82 and speakers 84. The detector 78 may detect the audio portion of a program to which the personal computer 80 is tuned by non-intrusively detecting the sound provided by the speakers 84 or by intrusively detecting the audio signal from a direct connection to the speaker, the audio output terminals, or the audio processing circuitry of the personal computer 80.

As has been taught by Thomas et al., in U.S. Pat. No. 5,629,739, a representation of the audio portion picked up by the detector 64 can be analyzed by a site unit (SU) 86 and/or a home unit (HU) 88 (which may be provided with data storage and forwarding unit capability) within the statistically selected monitoring site 62 in order to determine if the audio portion from the digital television set 66 contains television program identification codes. Alternatively, the representation of the audio portion picked up by the detector 64 can be analyzed at a remotely located data collection central office 90 in order to determine if the audio portion from the digital television set 66 contains such television program identification codes. The remotely located data collection central office 90 is schematically depicted as a computer based data collection central office that interchanges data with the home unit 88 over a communication network 92, such as a public switched telephone network, the Internet, or the like.

Similarly, a representation of the audio portion picked up by the detector 68 can be analyzed by a site unit 94 and/or the home unit 88 in order to determine if the audio portion from the analog television set 70 contains television program-identifying codes, and a representation of the audio portion picked up by the detector 78 can be analyzed by a site unit 96 and/or the home unit 88 in order to determine if the audio portion from the personal computer 80 contains television program-identifying codes. Alternatively, the representation of the audio portions picked up by the detectors 68 and 78 can be analyzed at the remotely located data collection central office 90 in order to determine if the audio portions from the analog television set 70 and the personal computer 80 contain television program identification codes.

Moreover, a person identifier 98 may be provided in order to identify the persons watching television programming on the digital television set 66. The person identifier 98 may be video camera, an IR camera, or the like. When such equipment is available in the statistically selected monitoring site 62, the site unit 86 may employ known head location and face recognition software (e.g., as taught by Lu in U.S. Pat. No. 4,858,000) for the identification of the viewing persons and for the collection of other demographic data. Similarly, person identifiers may be provided in order to identify the persons watching television programming on the analog television set 70 and on the personal computer 80.

Instead of analyzing the representations of the audio portions picked up by the detectors 64, 68, and 78 in order to determine if the audio portions from the corresponding digital television set 66, analog television set 70, and personal computer 80 contain television program-identifying codes, characteristic signatures can be extracted from these representations for subsequent comparison, either in the statistically selected monitoring site 62 or in the central office 90, with previously collected reference signatures in order to identify the television programs to which the digital television set 66, the analog television set 70, and the personal computer 80 are tuned.

Programs played by VCRs on the digital television set 66, on the analog television set 70, and on the personal computer 80 can be identified using either the code or the signature technique. Thus, if the programs being played carry program identification codes that are preserved through the process of recording and replay in the case of time shifted viewing, or that are recorded in the programs stored on tapes to be rented or sold, the program identification codes can be detected at the time that the programs are played so that the audiences of the programs may be measured. However, if the programs being played are non-encoded programs, or if the program identification codes are lost (e.g., during the recording process), then the embodiments of the present invention described herein can determine the programs being viewed, when the tapes are played, by extracting characteristic signatures from these programs and by matching the extracted signatures to reference signatures stored in a reference signature database. In this case, searching can be optimized by the use of well known hashing techniques.

Although the present invention may use either the code technique or the signature technique in order to measure audiences of programs played on digital television equipment, the present invention may use both of these two techniques so that one of the techniques backs up the other in the event that the one technique is unable to identify a viewer selected television program. For example, signatures are extracted and matched in order to identify a viewer selected television program only if identifying codes cannot be detected. As a further alternative, the present invention may use both of these two techniques simultaneously. Demographic data may also be collected in connection with the present invention.

It may be noted that, although the first embodiment 60 measures the great majority of the overall audience, it is not arranged to measure interactive features (e.g., co-transmitted advertising detail) that are expected to be part of the digital broadcasting environment. Therefore, an important feature of the following embodiment is that it measures interactive features.

Figure 3:
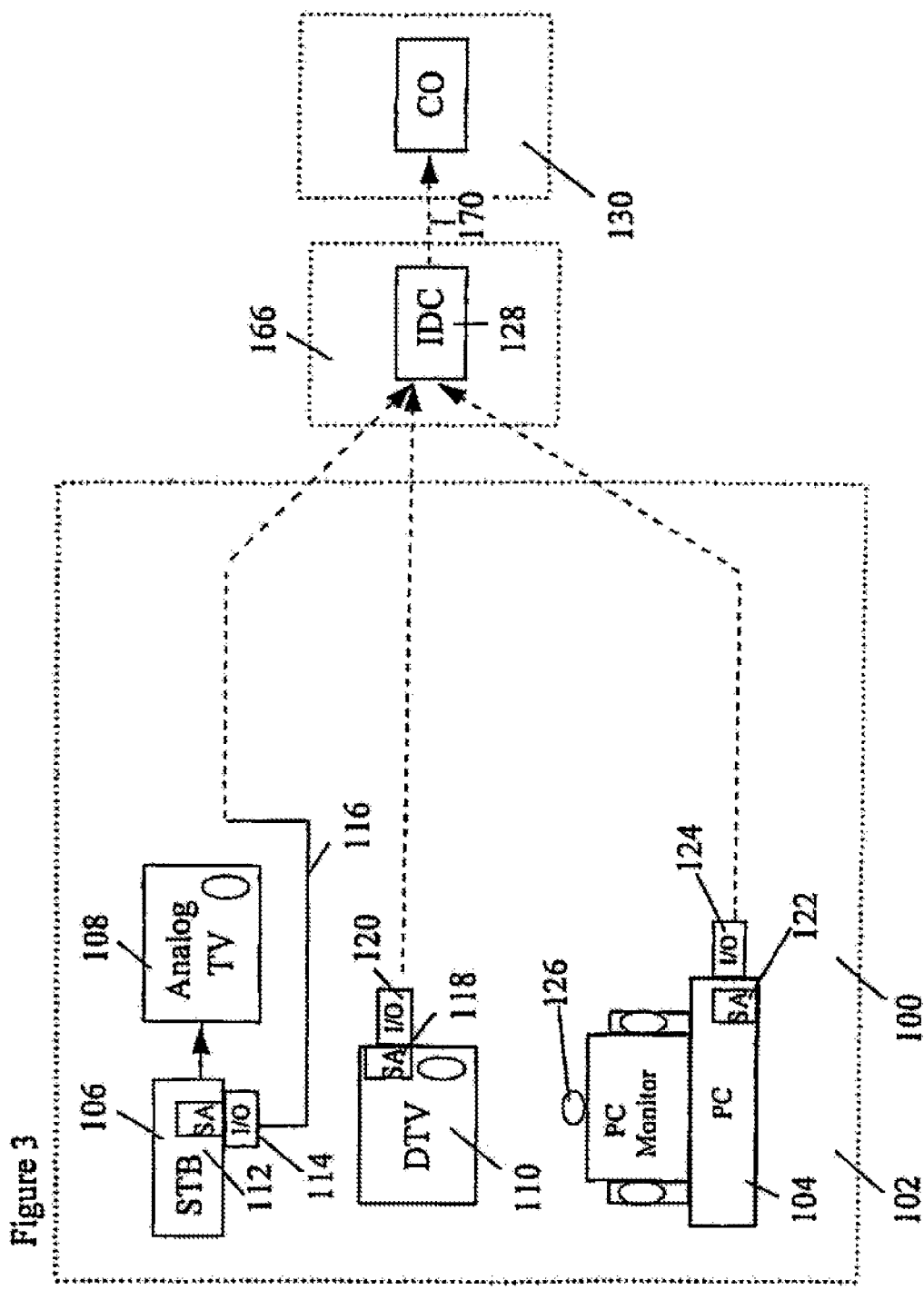
FIG. 3 is a schematic block diagram depicting a tuning measurement system which employs a software agent resident in some of the monitored receiving equipment and which is in accordance with a second embodiment of the present invention.

Accordingly, a second embodiment 100 of the present invention is provided as shown in FIG. 3. The second embodiment 100 measures tuning to digital television programming in connection with a statistically selected monitoring site 102. As will be apparent from the discussion below, this second embodiment 100 may include some or all of the features of the first embodiment 60, as well as the new features described below in connection with the second embodiment 100.

According to this second embodiment 100, tuning data, and possibly demographic data, are collected from digital television reception equipment that includes processing equipment preferably having adequate non-volatile or battery-backed memory available so that an algorithm, hereinafter referred to as a software agent, can be stored thereon. The digital television reception equipment of the second embodiment 100 may include (i) a personal computer 104 which may be similar to the personal computer 40 of FIG. 1, (ii) a digital converter 106 which may be similar to the digital converter 36 of FIG. 1, (iii) an analog television set 108 operating in response to the digital converter 106, and (v) a digital television set 110.

One or more software agents of the second embodiment 100, as disclosed in greater detail hereinafter, monitor operating tasks in order to create time-stamped records containing tuning and/or other data regarding operation of the particular pieces of equipment in which the software agents are resident. Such monitored operating tasks may be, for example, messages passed from a remote or other control operated by a user to a tuner or other program selector in order to select a television program being broadcast in a channel, messages passed from a controller of processing equipment to a tuner in order to select a television program being broadcast in a channel, or the like. Although software agents are expected to be able to effectively eavesdrop on data traffic passing though their hosts' data ports, the use of software agents would not fully measure tuning at viewing sites unless each item of television equipment at those sites has a respective software agent within it so that a complete set of operating tasks can be captured.

Accordingly, a software agent 112 is included in the digital converter 106. The software agent 112 monitors operating tasks in order to create time-stamped records containing tuning and/or other data regarding operation of the digital converter 106 in which the software agent 112 is resident. Thus, the software agent 112 detects, for example, a message relating to selection of a television program being broadcast in a selected channel. From this detected message, the identity of the selected television program may be determined. The software agent 112 is also arranged to eavesdrop on data traffic passing though its host's input/output data port 114, and to communicate over the input/output data port 114. Accordingly, programs to which the analog television set 108 is tuned may be detected through use of the software agent 112. The software agent 112 may be downloaded over a communication medium 116 to the digital converter 106 by use of the input/output data port 114. Alternatively, the software agent 112 may be a plug in, may be resident on a floppy disk, or the like.

Similarly, a software agent 118 is included in the digital television set 110. The software agent 118 monitors operating tasks associated with the digital television set 110 in order to create time-stamped records containing tuning and/or other data regarding operation of the digital television set 110 in which the software agent 118 is resident. The software agent 118 is also arranged to cooperate with its host's input/output data port 120. A software agent 122 is included in the personal computer 104. The software agent 122 monitors operating tasks associated with the personal computer 104 in order to create time-stamped records containing tuning and/or other data regarding operation of the personal computer 104 in which the software agent 122 is resident. The software agent 122 is also arranged to cooperate with its host's input/output data port 124.

Moreover, a person identifier 126 may be provided in order to identify the persons watching television programming on the personal computer 104. As in the case of the person identifier 98, the person identifier 126 may be video camera, an IR camera, or the like, and may be provided with any or all of the viewing equipment shown in FIG. 4.

The software agents 112, 118, and 122 may be telecommunication enabled so that television audience data from all the viewing sites in the statistically selected monitoring site 102 can be communicated, via the Internet, a public telephone system, or the like, to a locally located or remotely located intermediate data collector 128 and then to a remotely located central office 130 through a communication channel 170. The intermediate data collector 128 can be flexibly located either at the same statistically selected monitoring site 102, or at a remotely located site 166, or at the central office 130. For this purpose, the input/output data ports 114, 120, and 124 may be serial ports, parallel ports, universal serial buses (USB), firewires (according to IEEE 1394), or the like. The data transfer may, for example, be structured as a background task and take the form of a sequence of data packets, each of which is e-mailed or otherwise communicated to the remotely located intermediate data collector 128 during pauses in a user's on line sessions or at any other time. The intermediate data collector 128, for example, may be a computerized data collector or an Internet service provider. Alternatively, the intermediate data collector 128 may be a home unit, in which case, the intermediate data collector 128 may be located within the statistically selected monitoring site 102 and may itself be arranged to communicate tuning and demographic data via e-mail or other communication to the central office 130.

The software agent 122 additionally may monitor the personal computer 104 for interactive uses such as Internet usage (e.g., through logging of Universal Resource Locators, URLs), application software usage, and television viewing supported by the personal computer 104. Similarly, to the extent that the digital converter 106 and the digital television set 110 are web-enabled, the software agents 114 and 118 may monitor interactive uses such as Internet usage (e.g., through logging of URLs) and application software usage, as well as television viewing.

Because not all equipment that is encountered by a research firm doing television audience research, at least during the early part of the digital television broadcasting era, will be compatible with the software agent approach discussed above, the second embodiment 100 of the measurement system of the present invention may be arranged to include many or all of the features found in the first embodiment 60.

As described above, the first embodiment 60 measures the great majority of the overall audience by detecting the programs to which receivers are tuned by detecting program identification codes embedded in the programs, and/or by extracting signatures of the programs being viewed and by comparing the extracted signatures to reference signatures. Moreover, the second embodiment 100 measures not only the overall audience, but also interactive features provided with the programming. The embodiments described below are specifically arranged to measure, in an efficient manner, the digital television viewing data where multiple television programs are present in a common digital transmission channel (e.g., of 6 MHZ), particularly where a digital television set does not have an accessible operating system with which a software agent can reside. The first embodiment 60 is also useful where there is no I/O interface on the television set so that there is no easy way to read data from the television set.

Figure 4:
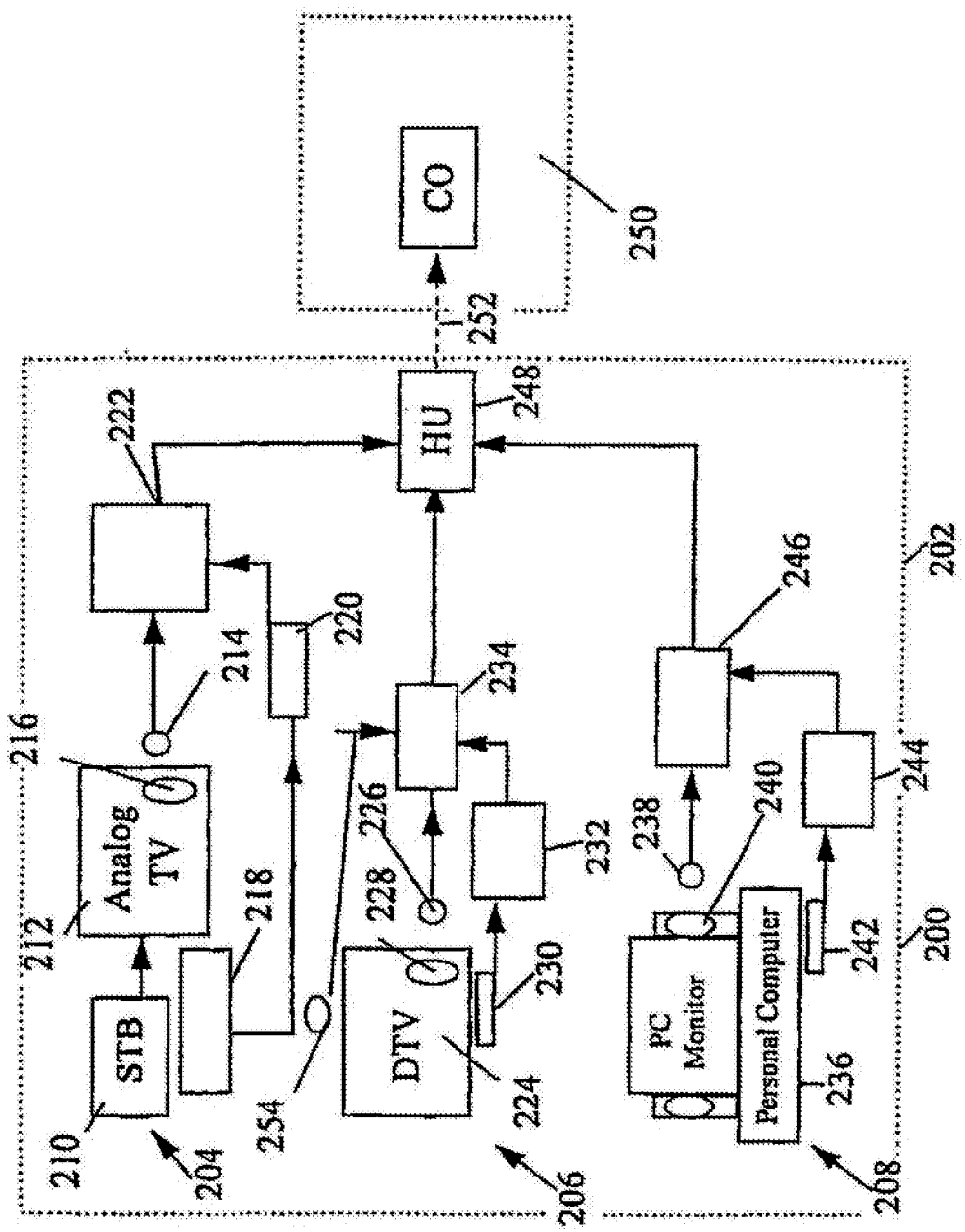
FIG. 4 is a schematic block diagram depicting the use of digital source detection in accordance with a third embodiment of the present invention.

FIG. 4 depicts a third embodiment 200 of the invention in which a statistically selected monitoring site 202, during the transition period when both analog and digital broadcasting occur, includes, for example, a first viewing site 204, a second viewing site 206, and a third viewing site 208. The first viewing site 204 includes a digital converter 210 connected to an analog television set 212. The audio portion of a program to which the analog television set 212 is tuned is detected by a detector 214. The detector 214 may detect this audio portion by non-intrusively detecting the sound provided by a speaker 216 of the analog television set 212 or by intrusively detecting the audio signal from a direct connection to the analog television set 212.

A probe 218 is provided to detect the intermediate frequency signal of the digital converter 210. A signal processor 220 demodulates the detected intermediate frequency signal to the baseband bit stream contained in the detected intermediate frequency signal, and then demultiplexes the baseband bit stream to recover the audio portion of the baseband bit stream.

A comparator 222 may be arranged to first determine whether there is a program identification code in the audio detected by the detector 214. If there is a program identification code in the audio detected by the detector 214, this program identification code identifies the program to which the analog television set 212 is tuned and is, therefore, logged. If there is no program identification code in the audio detected by the detector 214, the comparator 222 then scans the audio portion of the baseband bit stream provided by the signal processor 220 in order to detect the audio in a first program contained in the intermediate frequency signal detected by the probe 218. The comparator 222 compares this audio to the audio data from the detector 214. If there is a match, the program to which the digital converter 210 is tuned is known from the information provided by the signal processor 220. If there is no match, the comparator 222 then scans the audio portion of the baseband bit stream provided by the signal processor 220 in order to detect the audio in a second program contained in the intermediate frequency signal detected by the probe 218, and so on until the comparator 222 detects a match. Once a match is found, the major and minor channel numbers of the matched channel are known, and the corresponding program identifying ancillary code can be read from the corresponding data packet.

The second viewing site 206 includes a digital television set 224. The audio portion of a program to which the digital television set 224 is tuned is detected by a detector 226. The detector 226 detects this audio portion by non-intrusively detecting the sound provided by a speaker 228 of the digital television set 224 or by intrusively detecting the audio signal from a direct connection to the digital television set 224.

A probe 230 is provided to detect the intermediate frequency signal of the digital television set 224. A signal processor 232 operates similarly to the signal processor 220 in order to provide the audio portion of the baseband bit stream in the intermediate frequency signal detected by the probe 230. A comparator 234 operates similarly to the comparator 222 in order to first determine whether there is a program identification code in the audio detected by the detector 226 and, if there is not, to scan the audio portion of the baseband bit stream provided by the signal processor 232 until a match is found.

The third viewing site 208 includes a personal computer 236. The audio portion of a program to which the personal computer 236 is tuned is detected by a detector 238. The detector 238 detects this audio portion by non-intrusively detecting the sound provided by speakers 240 of the personal computer 236 or by intrusively detecting the audio signal from a direct connection to the personal computer 236.

A probe 242 is provided to detect the intermediate frequency signal of the personal computer 236. A signal processor 244 operates similarly to the signal processor 220 in order to provide the audio portion of the baseband bit stream in the intermediate frequency signal detected by the probe 242. A comparator 246 operates similarly to the comparator 222 in order to first determine whether there is a program identification code in the audio detected by the detector 238 and, if there is not, to scan the audio portion of the baseband bit stream provided by the signal processor 244 until a match is found.

The comparators 222, 234, and 246 provide their program identification codes from the audio or from the data packet, and/or match information to a home unit 248, which may be provided with data storage and forwarding unit capability, within the statistically selected monitoring site 202. A remotely located data collection central office 250 is schematically depicted as a computer based data collection central office that interchanges data with the home unit 248 over a communication network 252, such as a public switched telephone network, the Internet, or the like. Moreover, a person identifier 254 may be provided in order to identify the persons watching television programming on the digital television set 224. As in the case of the person identifier 98, the person identifier 254 may be video camera, an IR camera, or the like, and may be provided for any or all of the viewing equipment shown in FIG. 4.

Alternatively, instead of using intermediate frequency probes for the probes 218, 230, and 242, local oscillator probes may be used. A local oscillator probe may be employed to initially identify the channel tuned by its associated television receiver, which offers a significant speed advantage in the measurement. That is, because channel detection apparatus normally operates much faster than does audio signal comparison apparatus, the program determination process can be carried out in a hierarchical fashion in which the broadcast channel is first determined from the local oscillator signal by the signal processors 220, 232, and 244 (assuming that a program identification code is not first detected). Then, the comparators 222, 234, and 246 sequentially tune to the programs co-transmitted in the detected broadcast channel and compare the audio portion of the tuned program to the audio data from detectors 214, 226, and 238 in order to identify the program in the broadcast channel. In this way, the comparators 222, 234, and 246 are not required to sequentially tune through all of the programs in all of the available channels in order to determine the tuned program.

Figure 5:
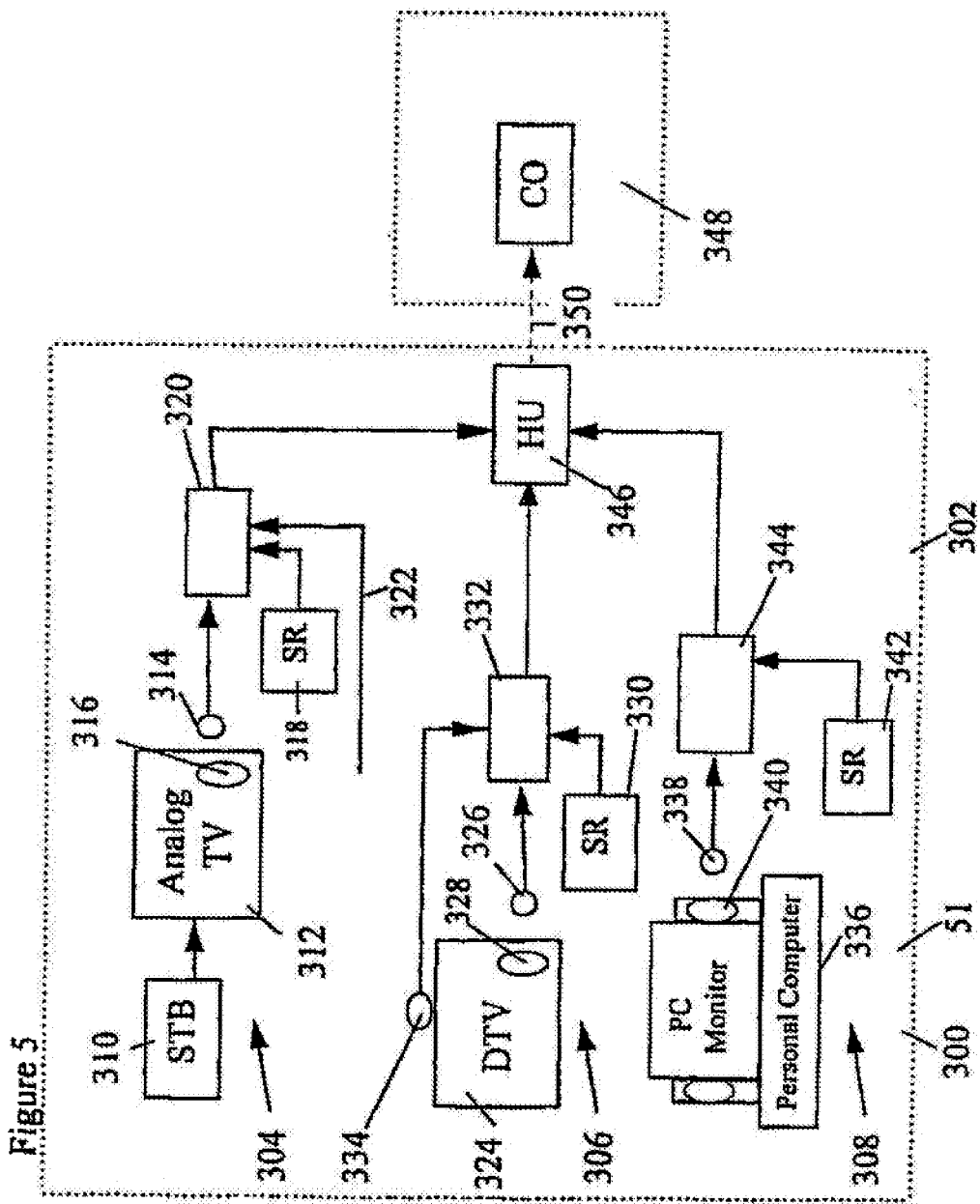
FIG. 5 is a schematic block diagram depicting the use of digital source detection in accordance with a fourth embodiment of the present invention.

A still further alternative is provided by a fourth embodiment 300 of the invention shown in FIG. 5. The fourth embodiment 300 is used in a statistically selected monitoring site 302 having a first viewing site 304, a second viewing site 306, and a third viewing site 308. The first viewing site 304 includes a digital converter 310 connected to an analog television set 312. The audio portion of a program to which the analog television set 312 is tuned is detected by a detector 314. The detector 314 may detect this audio portion by non-intrusively detecting the sound provided by a speaker 316 of the analog television set 312 or by intrusively detecting the audio signal from a direct connection to the audio processing circuitry of the analog television set 312.

A scanning receiver 318 is arranged to sequentially tune to each of the programs carried in each broadcast channel to which the digital converter 310 may be tuned, and to provide an audio portion of each such program to a comparator 320. The comparator 320 may be arranged to first determine whether there is a program identification code in the audio detected by the detector 314. If there is a program identification code in the audio detected by the detector 314, this program identification code is logged because it identifies the program to which the analog television set 312 is tuned. If there is no program identification code in the audio detected by the detector 314, the comparator 320 then compares the audio portion of a first program provided by the scanning receiver 318 to the audio data from the detector 314. If there is a match, the program to which the digital converter 310 is tuned is known from the information provided by the scanning receiver 318. Once a match is found, the major and minor channel numbers of the matched channel are known, and the corresponding program identifying ancillary code can be read from the corresponding data packet.

If there is no match, the comparator 320 compares the audio portion of a second program provided by the scanning receiver 318 to the audio data from the detector 314, and so on until the comparator 320 detects a match. A demographic input 322 may be used to provide demographic data to the comparator 320 which couples this demographic data, and time, with the program to which the digital converter 310 is tuned as a tuning record. The demographic input 322, for example, may be the well known Peoplemeter with which people currently identify themselves manually when they are viewing a program displayed on a television set.

The second viewing site 306 includes a digital television set 324. The audio portion of a program to which the digital television set 324 is tuned is detected by a detector 326. The detector 326 detects this audio portion by non-intrusively detecting the sound provided by a speaker 328 of the digital television set 324 or by intrusively detecting the audio signal from a direct connection to the digital television set 324.

A scanning receiver 330 is arranged to sequentially tune to each of the programs carried in each broadcast channel to which the digital television set 324 may be tuned, and to provide an audio portion of each such program to a comparator 332. The comparator 332 may be arranged to first determine whether there is a program identification code in the audio detected by the detector 326. If there is a program identification code in the audio detected by the detector 326, this program identification code is logged because it identifies the program to which the digital television set 324 is tuned. If there is no program identification code in the audio detected by the detector 326, the comparator 332 then compares the audio portion of a first program provided by the scanning receiver 330 to the audio data from the detector 326. If there is a match, the program to which the digital television set 324 is tuned is known from the information provided by the scanning receiver 330. If there is no match, the comparator 332 compares the audio portion of a second program provided by the scanning receiver 330 to the audio data from the detector 326, and so on until the comparator 332 detects a match.

Moreover, a person identifier 334 may be provided in order to identify the persons watching television programming on the digital television set 224. As in the case of the person identifier 98, the person identifier 254 may be video camera, an IR camera, or the like, and may be provided for any or all of the viewing equipment shown in FIG. 4. The comparator 332 couples the identities of the persons watching the digital television set 324, and time, with the program to which the digital television set 324 is tuned as a tuning record.

The third viewing site 308 includes a personal computer 336. The audio portion of a program to which the personal computer 336 is tuned is detected by a detector 338. The detector 338 detects this audio portion by non-intrusively detecting the sound provided by speakers 340 of the personal computer 336 or by intrusively detecting the audio signal from a direct connection to the personal computer 336.

A scanning receiver 342 is arranged to sequentially tune to each of the programs carried in each broadcast channel to which the personal computer 336 may be tuned, and to provide an audio portion of each such program to a comparator 344. The comparator 344 may be arranged to first determine whether there is a program identification code in the audio detected by the detector 338. If there is a program identification code in the audio detected by the detector 338, this program identification code is logged because it identifies the program to which the personal computer 336 is tuned. If there is no program identification code in the audio detected by the detector 338, the comparator 344 then compares the audio portion of a first program provided by the scanning receiver 342 to the audio data from the detector 338. If there is a match, the program to which the personal computer 336 is tuned is known from the major and minor channel numbers indicated by the match. If there is no match, the comparator 344 compares the audio portion of a second program provided by the scanning receiver 342 to the audio data from the detector 338, and so on until the comparator 344 detects a match. The comparator 344 couples time with the program to which the personal computer 336 is tuned as a tuning record.

The comparators 222, 234, and 246 provide their tuning records to a home unit 346, which may be provided with data storage and forwarding unit capability, within the statistically selected monitoring site 302. A remotely located data collection central office 348 is schematically depicted as a computer based data collection central office that interchanges data with the home unit 346 over a communication network 350, such as a public switched telephone network, the Internet, or the like.

It is likely that many, if not all, digital television sets, digital converters, and like digital equipment will have data ports that will provide output viewer-selected program information for use in consumer devices connected to the data ports. In connection with digital televisions, a data port is likely to provide, for example, the full major channel ATSC bitstream and information on virtual channels that may include analog or digital major channel selection, program (minor channel) selection, physical source (TV, VCR, DVD, etc.) identification, and the like. In connection with digital converters (i.e., set top boxes), a data port is likely to provide, for example, the full ATSC bitstream and information on virtual channels that may include analog or digital major channel selection, program (minor channel) selection, vertical blanking interval data reinserted on the correct line and field of analog signals, and the like.

Figure 6:
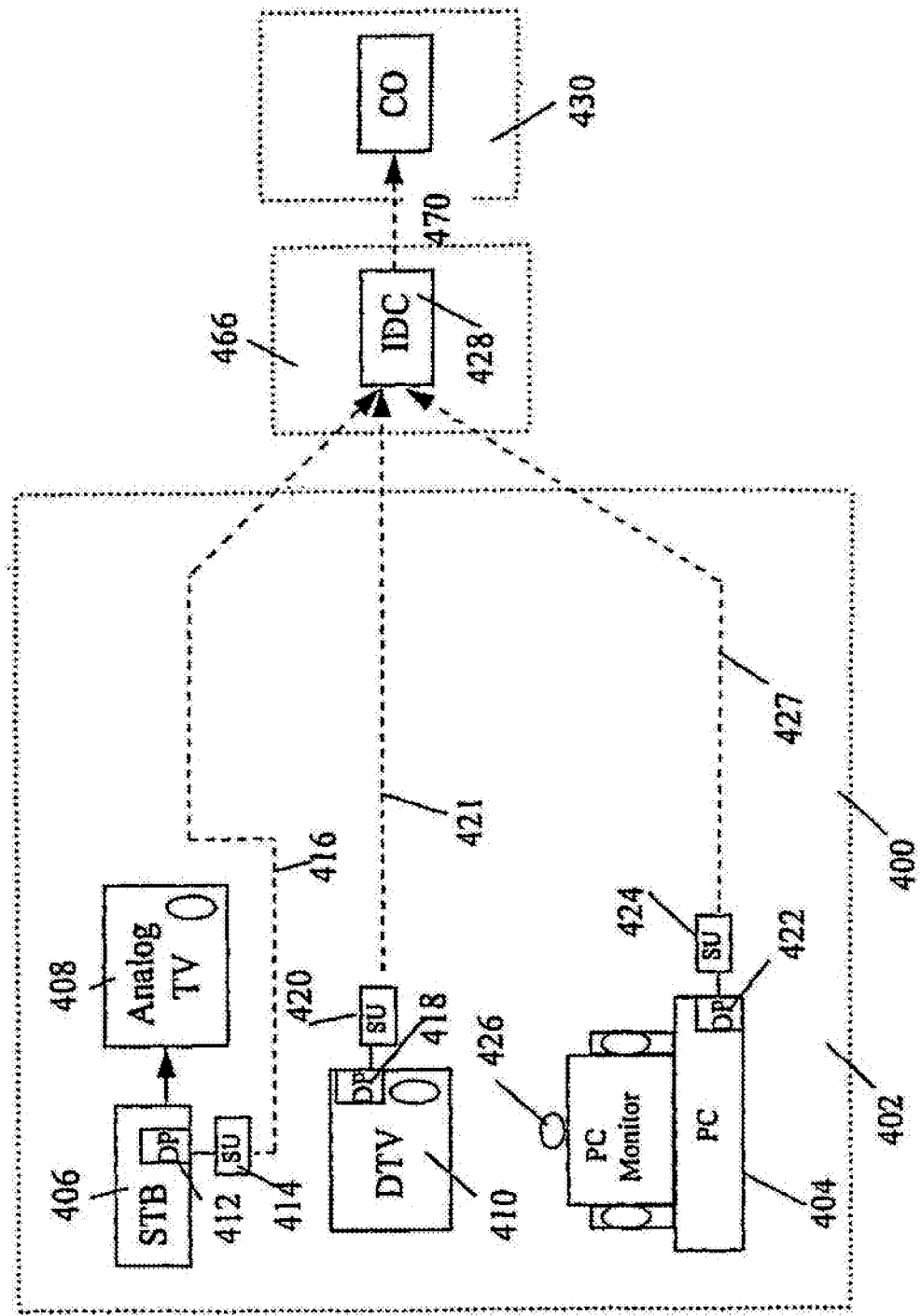
FIG. 6 is a schematic block diagram depicting the use of data ports on various television viewing equipment in order to measure television related data in accordance with a fifth embodiment of the present invention; and, FIG. 7 is a flow chart depicting the operation of a software agent constructed in accordance with the teachings of the present invention.

Accordingly, a fifth embodiment 400 of the present invention is provided as shown in FIG. 6. The fifth embodiment 400 measures tuning to digital television programming in connection with a statistically selected monitoring site 402. The fifth embodiment 400 may include some or all of the features of the previously described embodiments.

The fifth embodiment 400 permits tuning data, and possibly demographic data, to be collected from digital television reception equipment that includes (i) a personal computer 404, (ii) a digital converter 406, (iii) an analog television set 408 operating in response to the digital converter 406, and (v) a digital television set 410.

The digital converter 406 has a data port 412. A site unit 414 reads and stores the full ATSC bitstream, the analog or digital major channel selection, the program selection, vertical blanking interval data, and/or the like data available at the data port 412 in order to determine the program selected for viewing on the analog television set 408 as well as any other desired and available information. Moreover, the site unit 414 may be arranged to collect demographic data related to the viewers in the audience of the program selected for viewing on the analog television set 408. For example, the site unit 414 may collect demographic data from a person identifier, a Peoplemeter, or the like, as discussed above. All such data may be uploaded over a communication medium 416, which may be a wire, a power line, and IR link, an RF modem, or the like.

Similarly, the digital television set 410 has a data port 418. A site unit 420 reads and stores the full major channel ATSC bitstream, the major channel selection, the program selection, physical source identification, and the like data available at the data port 418 in order to determine the program selected for viewing on the digital television set 410 as well as any other desired and available information. Moreover, the site unit 420 may be arranged to collect demographic data related to the viewers in the audience of the program selected for viewing on the digital television set 408. For example, the site unit 420 may collect demographic data from a person identifier, a Peoplemeter, or the like, as discussed above. All such data may be uploaded over a communication medium 421.

Also, the personal computer 404 has a data port 422. A site unit 424 reads and stores the full major channel ATSC bitstream, the major channel selection, the program selection, and the like data available at the data port 422 in order to determine the program selected for viewing on the personal computer 404 as well as any other desired and available information. Moreover, a person identifier 426 may be provided in order to identify the persons watching television programming on the personal computer 404. As in the case of the person identifier 98, the person identifier 426 may be video camera, an IR camera, or the like, and may be provided with any or all of the viewing equipment shown in FIG. 6. All program and demographic data may be uploaded over a communication medium 427.

The site units 414, 420, and 424 may be telecommunication enabled so that television audience data from all the viewing sites in the statistically selected monitoring site 402 can be communicated, via the Internet, a public telephone system, or the like, to a locally located or remotely located intermediate data collector 428 and then to a remotely located central office 430 through a communication channel 470. The intermediate data collector 428 can be flexibly located either at the same statistically selected monitoring site 402, or at a remotely located site 466, or at the central office 430. For this purpose, the site units 414, 420, and 424 may be provided with serial ports, parallel ports, universal serial buses (USB), firewires (according to IEEE 1394), or the like. The intermediate data collector 428, for example, may be a computerized data collector or an Internet service provider. Alternatively, the intermediate data collector 428 may be a home unit, in which case, the intermediate data collector 428 may be located within the statistically selected monitoring site 402 and may itself be arranged to communicate tuning and demographic data via e-mail or other communication to the central office 430.

Figure 7:
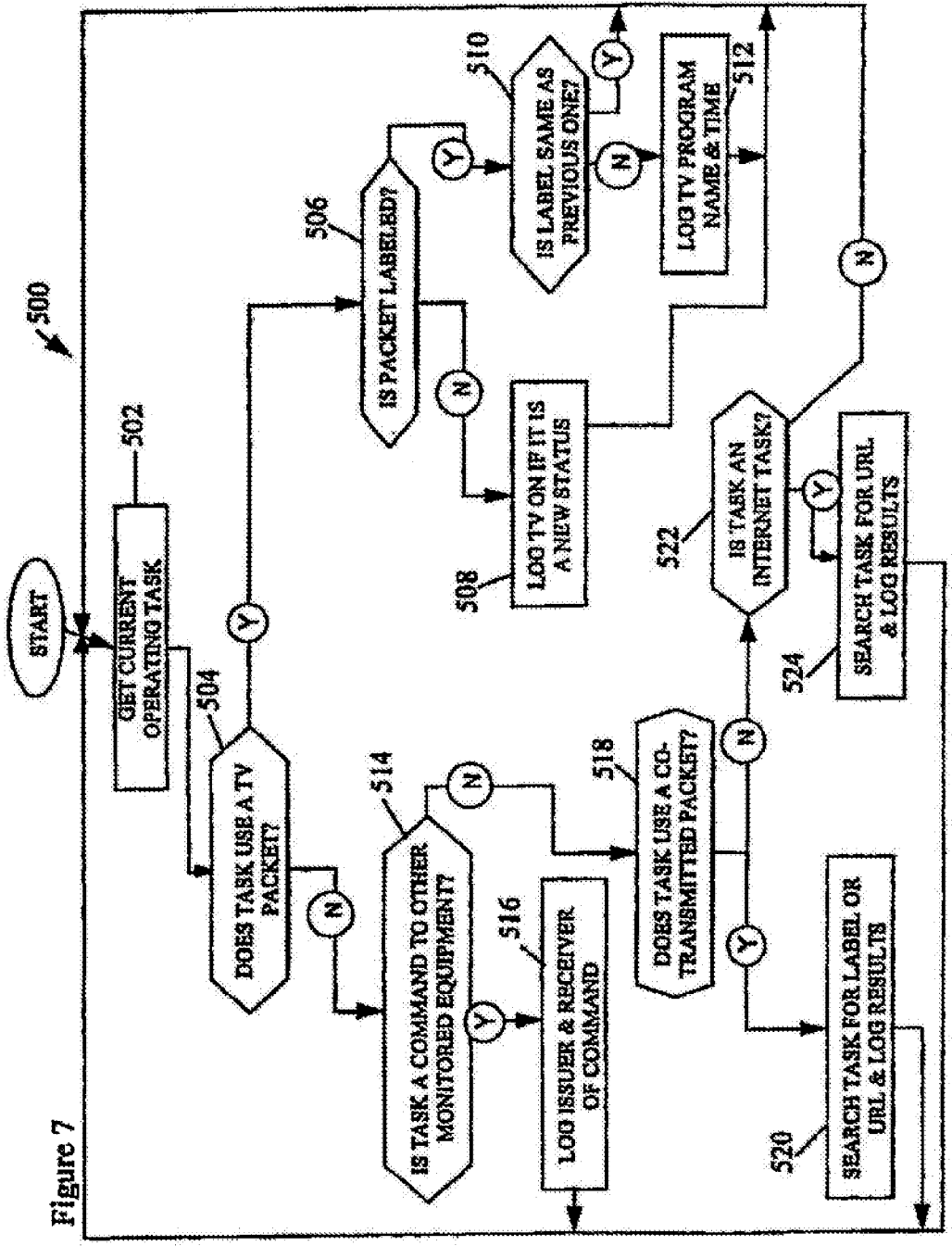

A software agent 500 is shown in FIG. 7. The software agent 500 can be used for any of the software agents 112, 118, and 122. As shown at a block 502 of the software agent 500, the software agent 500 copies the current operating task. If the current operating task uses a packet of television programming as determined at a block 504, the software agent 500 at a block 506 determines whether the data packet has a decodable packet label including a decodable program identification code, name, or other indicia. This program identification data packet is expected to be a feature of digital television programming, particularly if multiple programs are packed simultaneously as minor channels in a broadcast channel in a digital broadcasting environment, and is expected to identify the program tuned by the monitored television.

If the data packet does not have a decodable packet label, the software agent 500 at a block 508 causes the ON state of the monitored viewing equipment to be logged, provided that this ON state is a new status for the monitored viewing equipment and the monitored viewing equipment is ON. The balance of the measurement system (e.g., the audio signal methods employed by any of the other embodiments 60, 200, and 300 described above) is relied on in order to identify the tuning. Program flow then returns to the block 502 to await the next operating task.

On the other hand, if the data packet does have a decodable packet label, the software agent 500 determines at a block 510 whether the packet label from the data packet of the current operating task is the same as the packet label previously determined by the software agent 500. If so, there is no need to store the packet label unless it is merely indicative of continued viewing to an already identified television program. Accordingly, program flow returns to the block 502 to await the next operating task. However, if the packet label from the data packet of the current operating system task is not the same as the packet label previously determined at the block 506, the software agent 500 at a block 512 logs the identification of the television program as contained in the program label and also logs the time. Program flow then returns to the block 502 to await the next operating task.

If the current operating task does not use a packet of television programming as determined at a block 504, the software agent 500 at a block 514 determines whether the current operating task is a command to other monitored equipment (e.g., a command to the digital television receiver 110 to tune a different channel and to select a particular one of the N programs being broadcast in that channel). If the current operating task is a command to other monitored equipment, the software agent 500 at a block 516 logs as much detail as is available (e.g., the command itself, the identity of the issuer of the command, and the identity of the recipient of the command) in memory, and program flow returns to the block 502.

If the current operating task is not a command to other monitored equipment, the software agent 500 at a block 518 determines if co-transmitted data (i.e., data that is related to one of the television programs being broadcast in a channel and that is transmitted during the same time interval as the program) has been selected by a viewer. Co-transmitted data may comprise a guide to other available television programming, catalog-like details on products being advertised on the co-transmitted program, and the like. Some of these proposed uses of co-transmitted data will be configured so that one can infer what program is being viewed from a URL or other label that logically links the co-transmitted data to the television program. Accordingly, the software agent 500 at a block 520 searches the header portion of a task for such URL or other label, and logs such URL or other label that is found. Thereafter, program flow returns to the block 502.

If co-transmitted data has not been selected by a viewer, the software agent 500 at a block 522 determines if the user of the equipment has directed his or her browser, or other communication software, to access an internet page (assuming that the monitored viewing equipment being monitored is configured so that it has access to the Internet or other on-line service). If the user of the equipment has directed his or her browser, or other communication software, to access an internet page, the software agent 500 at a block 524 searches for a URL or other label, and logs such URL or other label that is found. Thereafter, program flow returns to the block 502. If the user of the equipment has not directed his or her browser, or other communication software, to access an internet page, program flow returns to the block 502.

As an example of the use of a software agent as describe above, consider the case of a person in a statistically selected monitoring site who is viewing a digital television program and who sees an interesting product being advertised. It is expected that the person will have the capability to request more data on that product by means of a simple mouse-click operation. This data, for example, will either be a subset of the data providing the displayed advertisement, or will be co-transmitted subsequently in the signal of the television program that the person has selected for viewing. This data would then be displayed in a separate window on the multi-windowed display being used for television viewing. An additional set of data could then be obtained by clicking on a hypertext link element of the initially displayed data. This action would result in downloading the desired additional data over the Internet. A software agent installed in this viewing equipment could thus log not only what program was being viewed, but could also supply additional marketing research data on the consumer's use of in-program advertising.

In addition to providing a device for monitoring tuning activity, the software agent of the present invention can be used to collect demographic data relative to the monitored viewing. In a manual approach to the collection of demographic data, the software agent could generate a status and prompting display in one window of the viewing equipment requiring a viewer or user to input the appropriate demographic data. This status and prompting display window could have an appearance similar to that provided by the peoplemeter hardware widely used in contemporary audience measurements and that displays a status reminder light for each occupant of a statistically selected monitoring site. However, in the comparable windowed display arrangement, the name of each occupant could be shown along with a status indicator.

If the software agent is used with a personal computer that can receive digital television programming, a variety of more nearly automatic and less intrusive approaches (from the television viewer's perspective) could be used to collect person's data and update a tiled status display. For example, it is well known to identify an individual user of a manual input device (such as a keyboard or a mouse) of a computer by the characteristic rates of data entry and pauses between data entries. In a television audience measurement, in which the occupant population to be monitored is very small, measurements of this sort should be expected to be highly accurate. Moreover, an increasing number of personal computers have video cameras associated with them, so that the user of the computer can engage in video conferences by telephone. When such equipment is available in a statistically selected monitoring site, a software agent comprising known head location and face recognition software (e.g., as taught by Lu in U.S. Pat. No. 4,858,000) can be employed for the identification persons and the collection of demographic data.

Certain modifications of the present invention have been discussed above. Other modifications will occur to those practicing in the art of the present invention. For example, the software agents 112, 118, and 122, as described above, monitor operating tasks. The operating tasks may be operating system events of the operating systems used by the equipment in which the software agent is resident. Indeed, the software agents 112, 118, and 122 may monitor any function of the monitored equipment as long as the desired data is collected.

Also, a statistically selected monitoring site according to each of the embodiments of the invention, as described above, includes certain viewing equipment as well as certain monitoring equipment. However, it should be understood that a statistically selected monitoring site according to the present invention may include any combination of the equipment incorporated in the embodiments described above, as well as other and/or different equipment.

Moreover, the software agent 500 described above can be generic so that it can be used with any piece of equipment with which it is compatible, or it may be specialized for each particular apparatus in which it is used. Also, the software agent 500 may be arranged to detect the all window activities conducted by an audience.

Furthermore, although not shown in FIGS. 2-5, the digital television reception equipment of the embodiments shown therein may further include auxiliary digital television equipment such as a VCR, a digital video disk player, a video game, or other entertainment systems.

Additionally, as described above, program identification codes are detected in order to identify television programs.

However, television programs may be identified by any indicia such as program names. Moreover, an internet page may be identified by its address or by an identification code or name or label or, in the case of an advertisement on the Internet, by its banner. Therefore, any indicia from which a television program or content associated with a television program may be identified is referred to herein generically as an identification datum.

Moreover, the home units 248 and/or 346 may be referred to herein as intermediate data collectors.

Accordingly, the description of the present invention is to be construed as illustrative only and is for the purpose of teaching those skilled in the art the best mode of carrying out the invention. The details may be varied substantially without departing from the spirit of the invention, and the exclusive use of all modifications which are within the scope of the appended claims is reserved.

What is claimed is:

1. A rating system to monitor a digital television or radio receiver, the receiver to receive a broadcast channel comprising multiple programs, at least one of the programs being packed as a minor channel in the broadcast channel and each minor channel including an identification datum, the receiver to read a first identification datum from a first channel to which the receiver is tuned and to subsequently read a second identification datum from a second channel to which the receiver is tuned, the rating system comprising:
   a software agent to read the first identification datum from a packet label included in a first packet of a digital stream corresponding to the first channel and to time stamp the first identification datum at a first time at which the first identification datum is read, the software agent to read the second identification datum from a second packet label included in a second packet of a digital stream corresponding to the second channel and to time stamp the second identification datum at a second time at which the second identification datum is read;
   a detector to detect an audio code embedded in an audio portion of at least one of the programs;
   an extractor to extract a signature from one or more characteristic features of the audio portion of the at least one of the programs;
   wherein at least one of the first and second channels is a minor channel and the system is to use the software agent and at least one of the detector and the extractor to record data to identify a first program tuned by the receiver.

2. The system of claim 1, wherein the system is to record a third time at which the receiver is turned off.

3. The system of claim 1, further comprising:
   a meter to separately receive the broadcast channel comprising a plurality of multiplexed digital streams, the meter to compare, at the time of channel change, a digital stream corresponding to the channel to which the receiver is tuned to each of the other digital streams within the broadcast channel until the meter finds a match; and
   the software agent to read an identification datum from the matching digital stream.

4. The system of claim 3, wherein:
   the plurality of multiplexed digital streams can be received at different frequencies;
   the meter is to record a first received frequency and a time of reception of the first received frequency; and
   the meter is to record a second received frequency and a time of reception of the second received frequency when the frequency of the received digital stream is changed.

5. The system of claim 3, wherein the meter comprises a memory to store the first and second identification data.

6. The system of claim 1, wherein the system is to transmit the first and second identification data to a remote computer.

7. The system of claim 1, wherein the software agent is to read at least one of the first and second identification data from a data packet contained in a digital television program in the broadcast channel.

8. The system of claim 1, wherein the system comprises a computer readable memory storing the software agent, and the first and second identification data identify first and second television programs.

9. The system of claim 1, wherein the software agent is to read data packets contained in digital television programming in order to obtain the first and second identification data.

10. The system of claim 1, wherein the system comprises a set top box to provide an analog television signal suitable for reception by an analog receiver.

11. The system of claim 1, wherein the receiver comprises digital television equipment.

12. The system of claim 1, wherein the receiver comprises a digital television, and a memory storing the software agent is provided within a set top box to provide a digital television signal to the digital television.

13. The system of claim 1, wherein the receiver comprises any one of the following: a personal computer provided with a television receiver; a Video Cassette Recorder (VCR); and a Digital Video Disk (DVD) player.

14. The system of claim 1, further comprising a person identification apparatus.

15. The system of claim 1, wherein the software agent is to detect window activities conducted by an audience.

16. The system of claim 1, further comprising a selector to select at least one of the detector, the extractor, and the software agent to identify the first program.

17. The system of claim 16, further comprising a packet retriever to retrieve audience measurement data packets from the receiver to identify the first program.

18. The system of claim 1, wherein the software agent is to log the first and second identification data and an Internet identification datum associated with an Internet task of a digital receiver receiving the programs.

19. The system of claim 1, wherein both the first channel and the second channel are major channels.

20. The system of claim 1, wherein both the first channel and the second channel are minor channels.

21. The system of claim 1, wherein one of the first and second channels is a major channel and the other of the first and second channels is a minor channel.

22. A method of rating digital television or radio programs, the method comprising:
   receiving multiple programs packed as minor channels in a broadcast channel, each minor channel including a respective identification datum,
   reading, with a software agent, a first identification datum from a digital stream corresponding to a first channel tuned by a digital receiver;
   when the first identification datum is decodable, timestamping, with the software agent, the first identification datum at approximately a time at which the first identification datum is read;
   reading, with the software agent, a second identification datum from a digital stream corresponding to a second channel tuned by the receiver, at least one of the first and second channels being a minor channel;
   when the second identification datum is decodable, timestamping, with the software agent, the second identification datum at approximately a time at which the second identification datum is read;

when at least one of the first or second identification data is not decodable, performing at least one of:

detecting, with a detector, an audio code embedded in an audio portion of the digital stream;

extracting, with an extractor, an audio signature from one or more characteristic features of the audio portion of the digital stream; and recording data from the software agent and at least one of the extractor and the detector to identify a first program tuned by the receiver.

23. The method of claim 22, wherein the first and second identification data are codes.

24. The method of claim 22, wherein the first and second identification data identify corresponding programs.

25. The method of claim 22, wherein the first and second identification data comprise any one of the following:

corresponding first and second program identification codes of corresponding first and second television programs;

corresponding first and second program names of corresponding first and second television programs;

corresponding first and second addresses of corresponding first and second Internet pages;

corresponding first and second identification codes of corresponding first and second Internet pages; and corresponding first and second banners of material viewed by an audience.

26. The method of claim 22, wherein the software agent is resident in a memory of the receiver.

27. The method of claim 22, wherein the software agent comprises a plug-in software agent.

\* \* \* \* \*